US012531363B2

(12) United States Patent
Laurx et al.

(10) Patent No.: US 12,531,363 B2
(45) Date of Patent: Jan. 20, 2026

(54) CONNECTOR ASSEMBLY

(71) Applicant: Molex, LLC, Lisle, IL (US)

(72) Inventors: John C. Laurx, Aurora, IL (US); Ronald Bradbery, Bloomingdale, IL (US); Joe Faia, Fox Lake, IL (US); Augusto P. Panella, Naperville, IL (US); Daniel B. McGowan, Glen Ellyn, IL (US)

(73) Assignee: Molex, LLC, Lisle, IL (US)

( * ) Notice: Subject to any disclaimer, the term of this patent is extended or adjusted under 35 U.S.C. 154(b) by 566 days.

(21) Appl. No.: 17/975,624

(22) Filed: Oct. 28, 2022

(65) Prior Publication Data

US 2023/0047149 A1 Feb. 16, 2023

Related U.S. Application Data

(63) Continuation of application No. 17/010,877, filed on Sep. 3, 2020, now Pat. No. 11,495,909.
(Continued)

(51) Int. Cl.
*H01R 13/6471* (2011.01)
*H01R 12/71* (2011.01)
(Continued)

(52) U.S. Cl.
CPC ......... *H01R 13/506* (2013.01); *H01R 12/716* (2013.01); *H01R 12/75* (2013.01);
(Continued)

(58) Field of Classification Search
CPC .... H01R 13/506; H01R 12/716; H01R 12/75; H01R 13/6585; H01R 13/6597;
(Continued)

(56) References Cited

U.S. PATENT DOCUMENTS 6,702,590 B2 * 3/2004 Zaderej .............. H01R 12/7082 439/607.05
7,195,519 B1 3/2007 Mcalonis et al.
(Continued)

FOREIGN PATENT DOCUMENTS

CN 102347554 A 2/2012
CN 203242849 U 10/2013
(Continued)

OTHER PUBLICATIONS

International Preliminary Report on Patentability received for PCT Application PCT Application No. PCT/US2020/048966, mailed on Mar. 17, 2022, 14 Pages.
(Continued)

*Primary Examiner* — Abdullah A Riyami
*Assistant Examiner* — Nelson R. Burgos-Guntin

(57) ABSTRACT

An electrical connector assembly can include a plug connector and a receptacle connector that can mate together. Conductive communication between the plug and receptacle connectors is established by mating signals terminals and mating ground terminals contained in terminal subassemblies accommodated in each connector. To align and support the signal and ground terminals, the terminals may be part of a terminal wafer and the terminal subassembly can be assembled from one or more wafers. The terminal wafer may include grounding features to improve the electrical characteristics and data transmission through the electrical connector assembly.

20 Claims, 38 Drawing Sheets

Related U.S. Application Data

(60) Provisional application No. 62/897,006, filed on Sep. 6, 2019.

(51) Int. Cl.

| | |
|---|---|
| ***H01R 12/75*** | (2011.01) |
| ***H01R 13/506*** | (2006.01) |
| ***H01R 13/6585*** | (2011.01) |
| ***H01R 13/6597*** | (2011.01) |
| *H01R 12/70* | (2011.01) |

(52) U.S. Cl.
CPC ..... *H01R 13/6585* (2013.01); *H01R 13/6597* (2013.01); *H01R 12/707* (2013.01)

(58) Field of Classification Search
CPC .......................... H01R 12/707; H01R 13/6471; H01R 13/405; H01R 13/6594; H01R 43/205; H01R 12/79
See application file for complete search history.

(56) References Cited

U.S. PATENT DOCUMENTS

| | | | | |
|---|---|---|---|---|
| 7,621,760 | B1 * | 11/2009 | Barr | H01R 13/6585 439/607.05 |
| 7,731,541 | B1 | 6/2010 | Lee et al. | |
| 8,944,831 | B2 * | 2/2015 | Stoner | H05K 3/4038 439/108 |
| 9,780,517 | B2 * | 10/2017 | Zerebilov | H01R 43/26 |
| 10,673,182 | B2 | 6/2020 | Ellison | |
| 10,700,462 | B2 | 6/2020 | Schneider | |
| 11,171,445 | B1 | 11/2021 | Shen et al. | |
| 11,189,943 | B2 | 11/2021 | Zerebilov et al. | |
| 2003/0013325 | A1 | 1/2003 | Zaderej et al. | |
| 2004/0266273 | A1 * | 12/2004 | Wu | H01R 13/6587 439/701 |
| 2010/0075516 | A1 | 3/2010 | Horchler | |
| 2010/0151726 | A1 | 6/2010 | Fedder | |
| 2011/0151708 | A1 | 6/2011 | Kaneko et al. | |
| 2011/0212650 | A1 | 9/2011 | Amleshi et al. | |
| 2011/0223805 | A1 | 9/2011 | Regnier et al. | |
| 2011/0250788 | A1 | 10/2011 | Davison et al. | |
| 2012/0034820 | A1 | 2/2012 | Lang et al. | |
| 2012/0264334 | A1 | 10/2012 | Laurx et al. | |
| 2013/0005164 | A1 | 1/2013 | Smink et al. | |
| 2013/0034977 | A1 | 2/2013 | Cina et al. | |
| 2013/0130547 | A1 * | 5/2013 | Simpson | H01R 13/6581 439/607.01 |
| 2013/0171885 | A1 | 7/2013 | Zhang | |
| 2013/0273781 | A1 * | 10/2013 | Buck | H01R 13/6585 439/626 |
| 2014/0098508 | A1 | 4/2014 | Dunham | |
| 2014/0273663 | A1 | 9/2014 | Cartier, Jr. et al. | |
| 2014/0377971 | A1 | 12/2014 | Mathews et al. | |
| 2015/0031238 | A1 * | 1/2015 | Davis | H01R 12/716 439/607.05 |
| 2015/0079845 | A1 * | 3/2015 | Wanha | H01R 13/6477 439/607.41 |
| 2016/0268739 | A1 * | 9/2016 | Zerebilov | H01R 4/66 |
| 2016/0336691 | A1 | 11/2016 | De Boer | |
| 2017/0006733 | A1 | 1/2017 | Gregori et al. | |
| 2017/0025783 | A1 | 1/2017 | Astbury et al. | |
| 2017/0047688 | A1 | 2/2017 | Casher et al. | |
| 2019/0044285 | A1 * | 2/2019 | Dunham | H01R 12/716 |
| 2019/0089097 | A1 | 3/2019 | Cho et al. | |
| 2020/0083627 | A1 | 3/2020 | Peloza et al. | |
| 2020/0244010 | A1 * | 7/2020 | Chua | H01R 13/629 |
| 2020/0321727 | A1 | 10/2020 | Li et al. | |
| 2020/0350731 | A1 | 11/2020 | Buck et al. | |
| 2020/0366019 | A1 | 11/2020 | Hsiao et al. | |
| 2021/0075143 | A1 | 3/2021 | Laurx et al. | |
| 2021/0126404 | A1 | 4/2021 | Laurx et al. | |
| 2021/0210906 | A1 * | 7/2021 | Chua | H01R 13/6596 |
| 2021/0234291 | A1 | 7/2021 | Zerebilov | |
| 2021/0234315 | A1 | 7/2021 | Ellison et al. | |
| 2021/0305740 | A1 | 9/2021 | Mongold et al. | |
| 2021/0320461 | A1 | 10/2021 | Buck et al. | |
| 2021/0351531 | A1 | 11/2021 | Chen | |

FOREIGN PATENT DOCUMENTS

| | | | |
|---|---|---|---|
| CN | 107425366 | A | 12/2017 |
| CN | 208637725 | U | 3/2019 |
| CN | 209045918 | U | 6/2019 |
| JP | 2013038077 | A | 2/2013 |
| JP | 2017033699 | A | 2/2017 |
| KR | 20130110016 | A | 10/2013 |
| KR | 101975818 | B1 | 5/2019 |
| WO | 2018170209 | A1 | 9/2018 |

OTHER PUBLICATIONS

International Search Report and Written Opinion received for PCT Application No. PCT/US2020/048966, mailed on Dec. 10, 2020, 15 Pages.
Non-Final Rejection received for U.S. Appl. No. 17/010,877, mailed on Dec. 12, 2021, 11 Pages.

* cited by examiner

CONNECTOR ASSEMBLY

RELATED APPLICATIONS

This application is a continuation application of U.S. application Ser. No. 17/010,877 filed on Sep. 3, 2020 which claims priority to U.S. Provisional Application No. 62/897,006 filed on Sep. 6, 2019, which are incorporated herein by reference in their entireties.

TECHNICAL FIELD

The present disclosure relates generally to electrical connectors and, more specifically, to input/output connectors suitable for use in high data rate applications.

BACKGROUND

Input/output (IO) connectors can be designed for a variety of systems, including board-to-board, wire-to-wire, and wire-to-board systems. A wire-to-board system includes a free-end connector that is attached to a wire, and a fixed-end connector that is attached to a board. A wide range of suitable designs exist for each type of system, depending on requirements and the environment where the connectors are intended to be used.

For applications where data rates are high and physical space is restricted, however, a number of competing requirements make the connector design more challenging. High data rates (data rates equal to or above 25 Gbps) typically use differentially coupled signal pairs in which two conductors are electrically coupled and physically arranged in pairs to transmit a differential signal. The signal being transmitted is reflected by the electrical difference measured between the conductor pairs. Differential signaling helps provide greater resistance to spurious signals and electronic crosstalk, and preferably maintains sufficient spacing to avoid creating inadvertent signaling modes with adjacent differently coupled signals pairs. In the connector interface, ground terminals can be added to create a return path to electrical ground and to provide shielding between differential pairs. However, if space is a problem then it becomes desirable to shrink the pitch of the connector and bring all the terminals closer together (which tends to increase the cross talk).

Thus, electrical connectors are typically designed to meet both mechanical and electrical requirements. High speed or high data rate electrical connectors are often used in, for example, backplane applications that require very high conductor density and high data rates. In order to achieve the desired mechanical and electrical requirements, such connectors often incorporate a plurality of wafer assemblies having an insulative web that supports a plurality of electrically conductive terminals. The use of wafer assemblies is often desirable to create a structure capable of achieving the desired high data rate that is also robust enough to support the desired assembly processes. However, where high data rates are desired and physical space is minimal, the wafers must be configured to minimize the physical foot print of the connector while maintaining adequate electrical characteristics for the transmission of data. The present disclosure is directed to an electrical connector for application in such circumstances.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

The disclosure describes an electrical connector assembly for electrically interconnecting to substrates such as a printed circuit board and a plurality of cables. The electrical connector assembly can include a plug connector that can mate to a receptacle connector. Accommodated in each the plug and receptacle connectors can be a respective terminal subassembly made from a plurality of terminal wafers. The terminal wafers include conductive terminal arrays disposed in a non-conductive terminal support molding. The terminal array may include signal terminals for transmitting data signal and ground terminals. Each of the terminals may be elongated with opposing ends configured to mate or mount to corresponding terminals in another connector or with the substrate or cables and a planar mid-body portion may extend between the opposing ends. The signal and ground terminals are typically aligned in a common array plane with the terminal wafer.

In an aspect, the terminal subassembly of either the plug or receptacle connector can be associated with a ground bar that has a plurality of projecting blades that make mechanical and electrical contact with the plurality of ground terminals in a terminal wafer. The ground bar may be oriented perpendicularly to the common array plane of the terminal array and may contact the ground terminals intermediately between a mating end and a mounting end. A possible advantage connecting the grounding bar between the plurality of ground terminals is that the grounding bar may provide a shortened ground path that may advantageously affect electrical characteristics of the terminal wafer.

In another aspect, the insulator housing of the plug receptacle and the terminal subassembly therein can be movable with respect to each other between a first operational position and a second operative position. In the first operational position, the mounting ends of the signal and ground terminals in the terminal array can extend below a mounting face delineated by the insulator housing to contact conductive ground pads on a substrate. Spacing the mounting face of the insulator housing above the substrate may facilitate soldering of the terminal mounting ends to the substrate. In the second operational position, the insulator housing and terminal subassembly may move with respect to each other so that the mounting face is adjacent the substrate and coplanar with the mounting ends of the signal and ground terminals. Cantilevered latch arms and latch recesses can cooperatively interact to function as detests for moving the insulator housing and terminal subassembly between the first and second operational positions.

In another aspect, the terminal wafers can include a ground shielding that provides additional electrical grounding for the ground terminals. The ground shielding can positioned adjacent to terminal support molding and is coextensive with the rest of the terminal wafer. The ground shielding can include a plurality of grounding projections that can extend through the terminal support molding to mechanically and electrically connect with the ground terminals in the terminal array. The ground shielding may provide additional shielding for conductors that extend into and are terminated in the terminal wafer.

The above features and advantages of the disclosure as well as others will be apparent from the following detailed description and the accompanying drawings.

BRIEF DESCRIPTION OF THE DRAWINGS

The present disclosure is illustrated by way of example and not limited in the accompanying figures in which like reference numerals refer to like elements and in which.

DETAILED DESCRIPTION OF THE PREFERRED EMBODIMENTS

Figure 1:
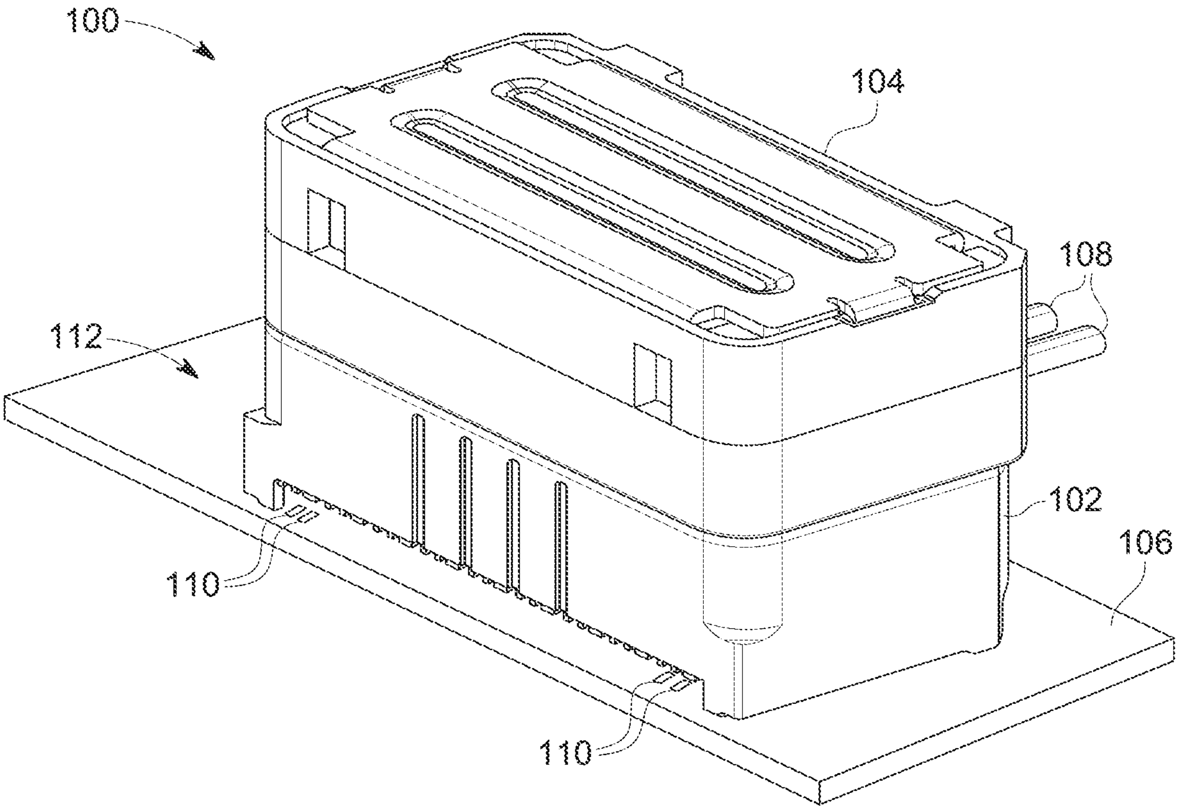
FIG. 1 is a perspective view of a connector system including a plug connector and a receptacle connector mounted to a substrate according to the present disclosure.
Figure 2:
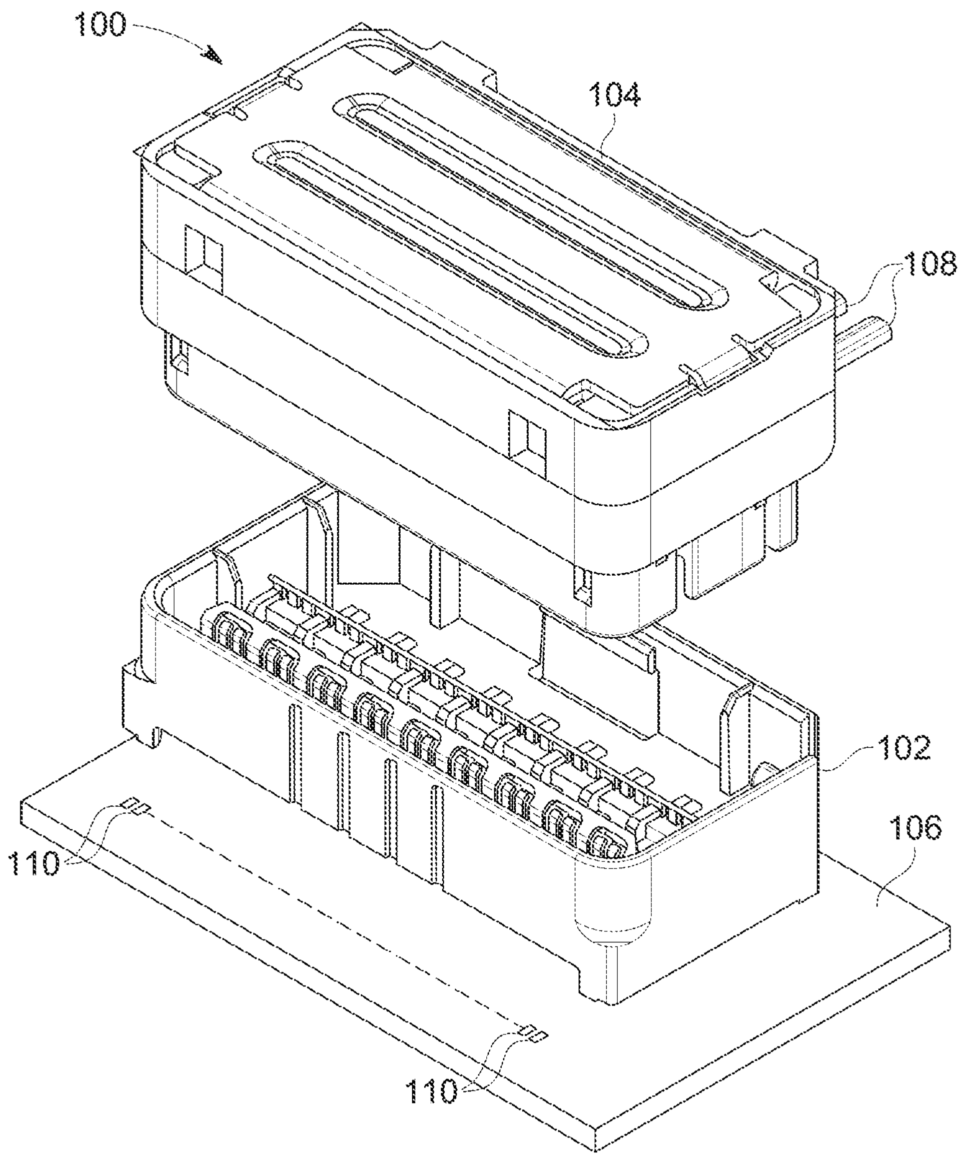
FIG. 2 is a perspective exploded view of the connector system of FIG. 1 in an unmated condition with the plug connector mounted on a substrate and unmated from the receptacle connector.

Referring to FIGS. 1-4, a wire-to-board connector assembly 100 is depicted. The connector assembly 100 includes a plug connector 102 and a receptacle connector 104. The plug connector 102 is configured to be mounted on a substrate 106 and the receptacle connector 104 is configured to be terminated to a plurality of electrically conductive cables 108. The plug connector 102 can be mated to the receptacle connector 104 to establish electrical communication between the substrate 106 and the plurality of conductive cables 108. The plug connector 102 may be placed adjacently against an surface of the substrate 106 and the receptacle connector 104 can be arranged so that the cables 108 are directed parallel to the substrate and generally perpendicular to the mating or stacking direction of the plug and receptacle connectors 102, 104. The connector assembly 100 thus has an orthogonal configuration. Moreover, the vertical height of plug connector 102 and the receptacle connector 104 can be minimized so the connector assembly 100 maintains a low profile for spacing considerations.

Figure 3:
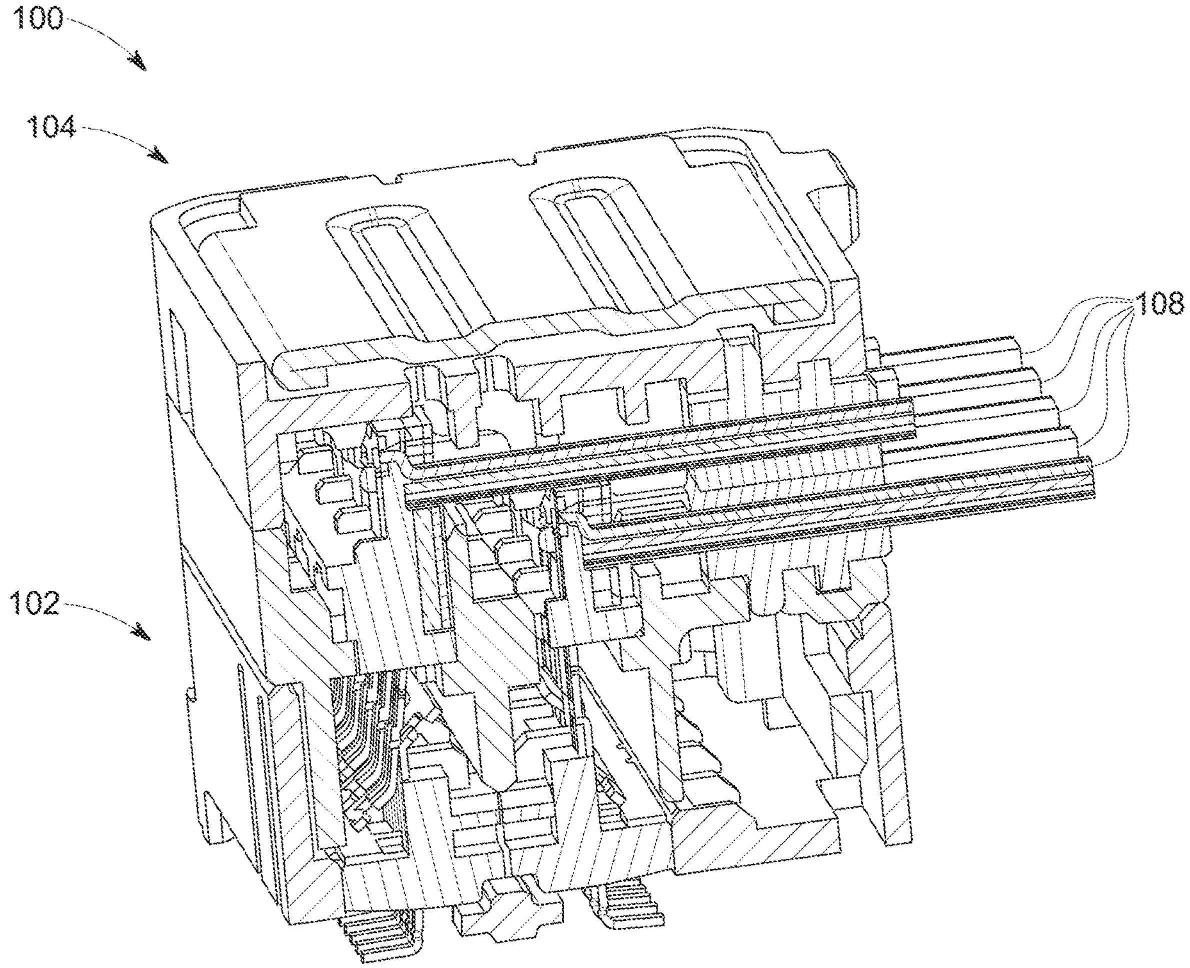
FIG. 3 is a cross-sectional perspective view of the connector system of FIG. 1 illustrating the plug connector and the receptacle connector mated together.
Figure 4:
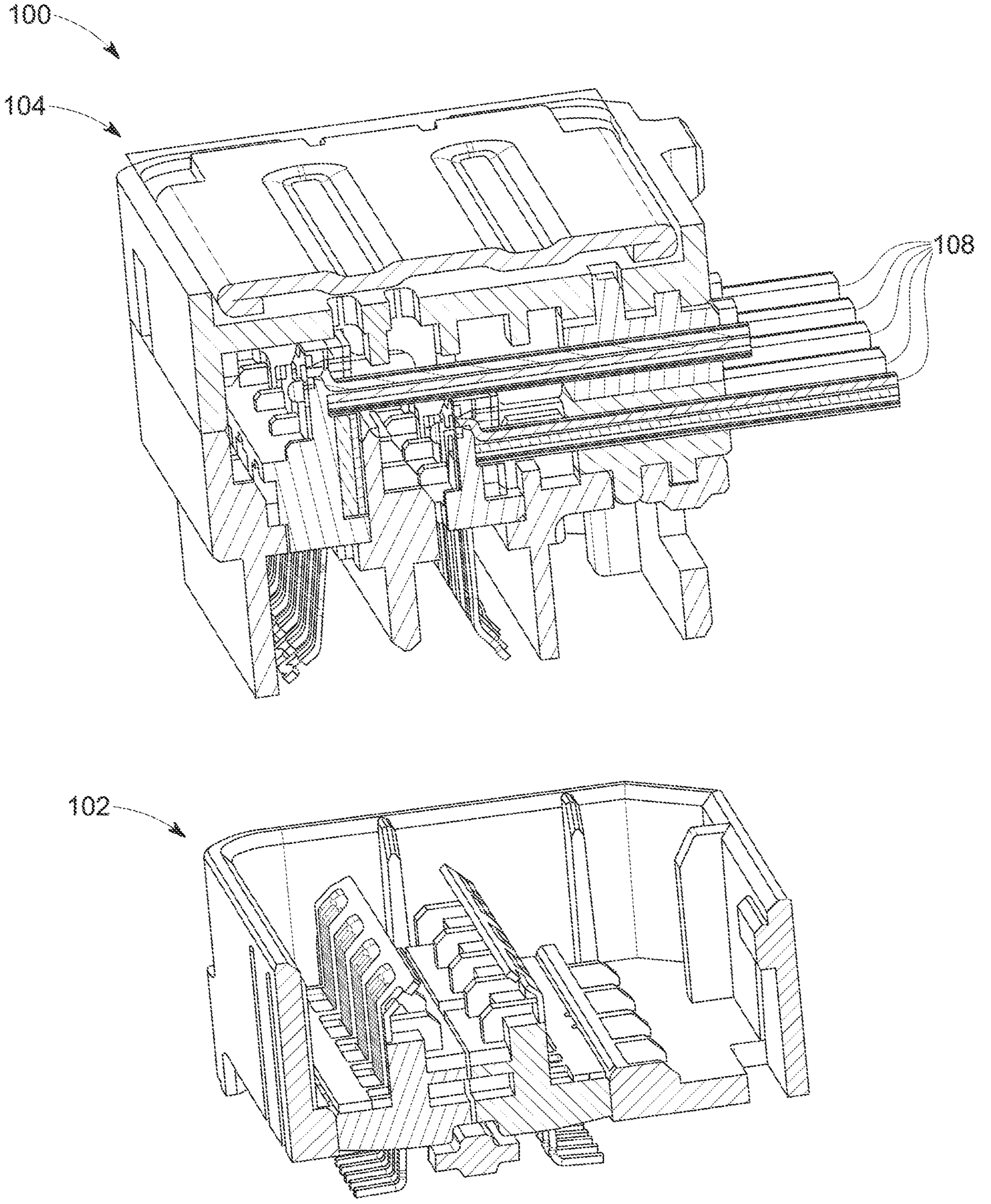
FIG. 4 is a cross-sectional assembly view of the connector system of FIG. 1 illustrating the plug connector unmated from the receptacle connector.
Figure 5:
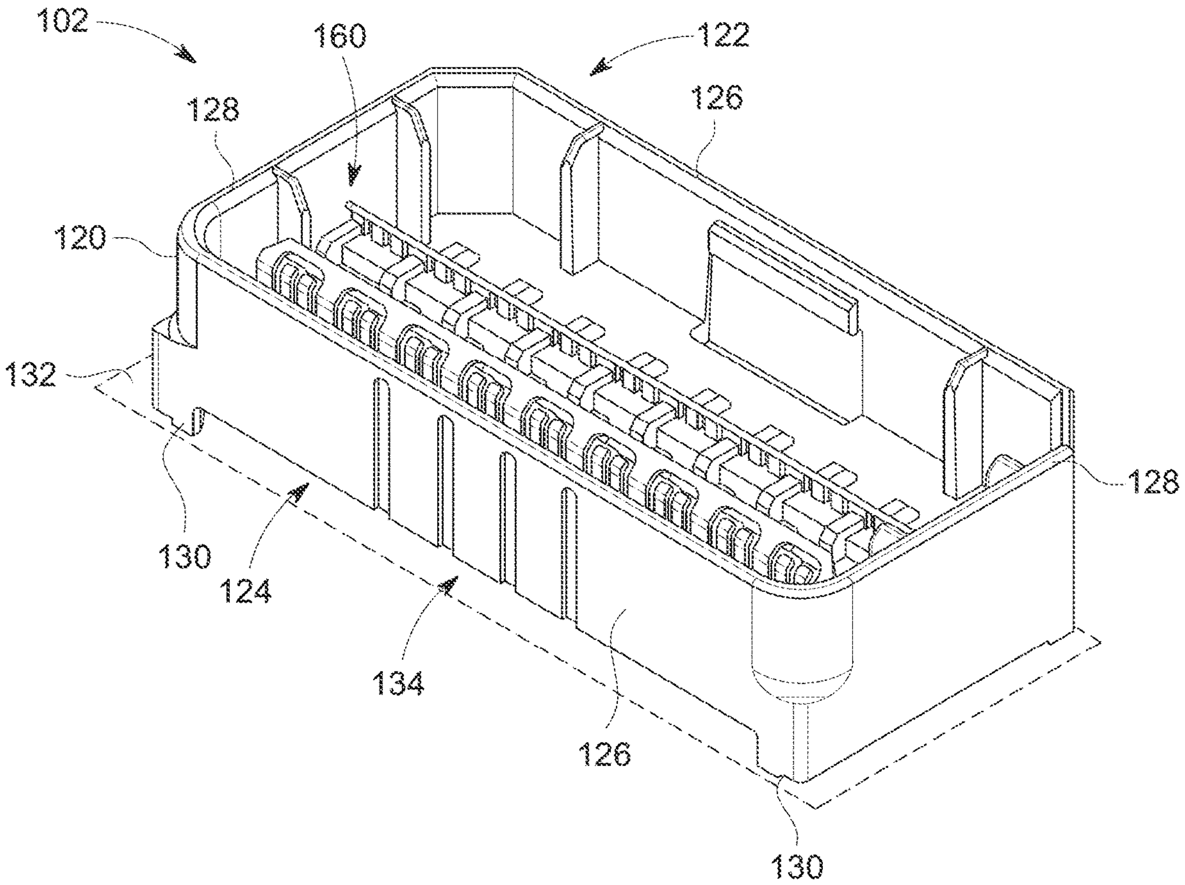
FIG. 5 is a perspective view from above of an embodiment of the plug connector of FIG. 1 illustrating the plug housing and a terminal subassembly with signal and around terminals arranged therein.
Figure 6:
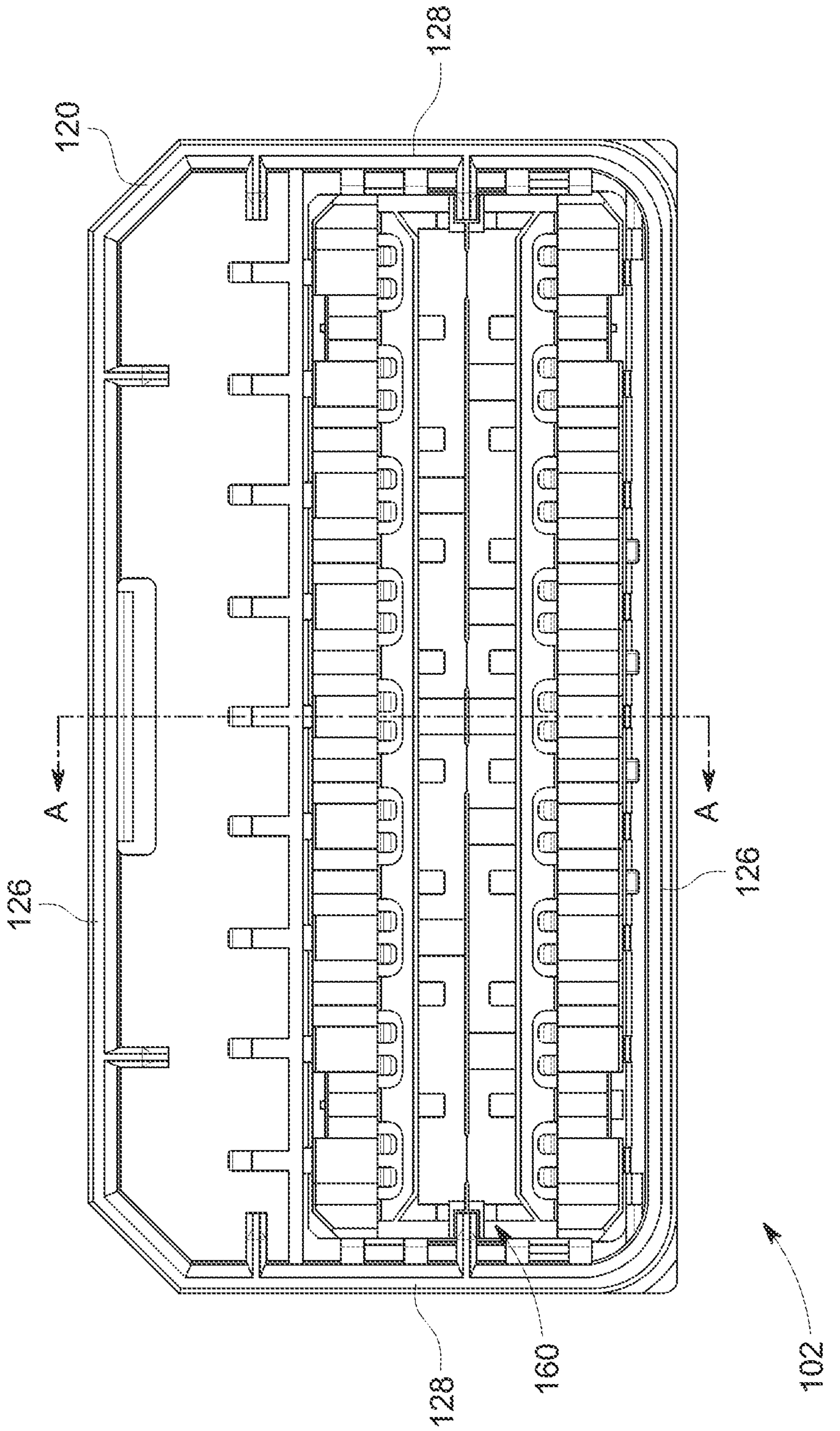
FIG. 6 is a top plan view of the plug connector of FIG. 5 illustrating the plug housing with the terminal subassembly having signal and ground terminals arranged therein.

The substrate 106 may be any type of generally planar member such as a printed circuit board, a backplane board, or a flexible circuit having electrically conductive traces electrically connected to a plurality of electrically conductive pads 110 on a mounting surface 112 of the substrate. As best depicted in FIGS. 3 and 4, the plug connector 102 and the receptacle connector 104 can include a respective plurality of conductive contacts or terminals disposed therein that can make electrically conductive contact with each other when the plug and receptacle connectors are mated. The connector assembly 100 can be configured so that the plug connector 102 and the receptacle connector 104 are releasable to facilitate assembly and interchangeability of electrical components to which the plug connector and receptacle connector are operatively associated with.

Referring to FIGS. 5-8, the plug connector 102 includes a plug housing 120 and a terminal subassembly 160. The plug housing 120 is generally rectangular and has a mating face 122 and parallel but opposing and spaced apart mounting face 124. When the plug connector 102 is mounted to the substrate, the mounting face 124 of the plug housing is adjacent the substrate and the mating face 122 projects away from the substrate and is oriented to abut the receptacle connector when mated thereto. The plug housing 120 includes a pair of spaced apart, elongated sidewalls 126 that are integrally joined to a pair of spaced apart, shorter end walls 128 that extend between the sidewalls with the sidewalls and end walls orthogonally arranged to provide the rectangular shape of the plug housing 120. The sidewalls 126 and the end walls 128 join the mating face 122 and mounting face 124. The spaced apart sidewalls 126 and end walls 128 may be integral with each other and define an enclosure or shell that can surround and protect the terminal subassembly 160. In an embodiment, the corners formed by the intersections of the sidewalls 126 and the end walls 128 may include bevels, fillets, or chamfers as illustrated that may assist in mating the plug connector 102 with the receptacle connector. The plug housing 120 may be made from any suitable, non-conductive material such as molded thermoplastic and may be referred to as an insulator housing.

In an embodiment, the plug housing 120 can include a plurality of standoffs 130 that are associated with the mounting face 124 and that are intended to contact the substrate when the plug connector 102 is mounted thereon. The standoffs 130 delineate a mounting plane 132 (indicated in dashed lines) that will be adjacent or coplanar to the surface of the substrate and that serves as the lower extension of the plug housing 120. In the illustrated embodiment, the standoffs 130 may be included at the four corners of the intersecting sidewalls 126 and end walls 128. The standoffs 130 may be separated from each other by one or more gaps 134 that extend laterally along the lower edge of the sidewalls 126.

Figure 7:
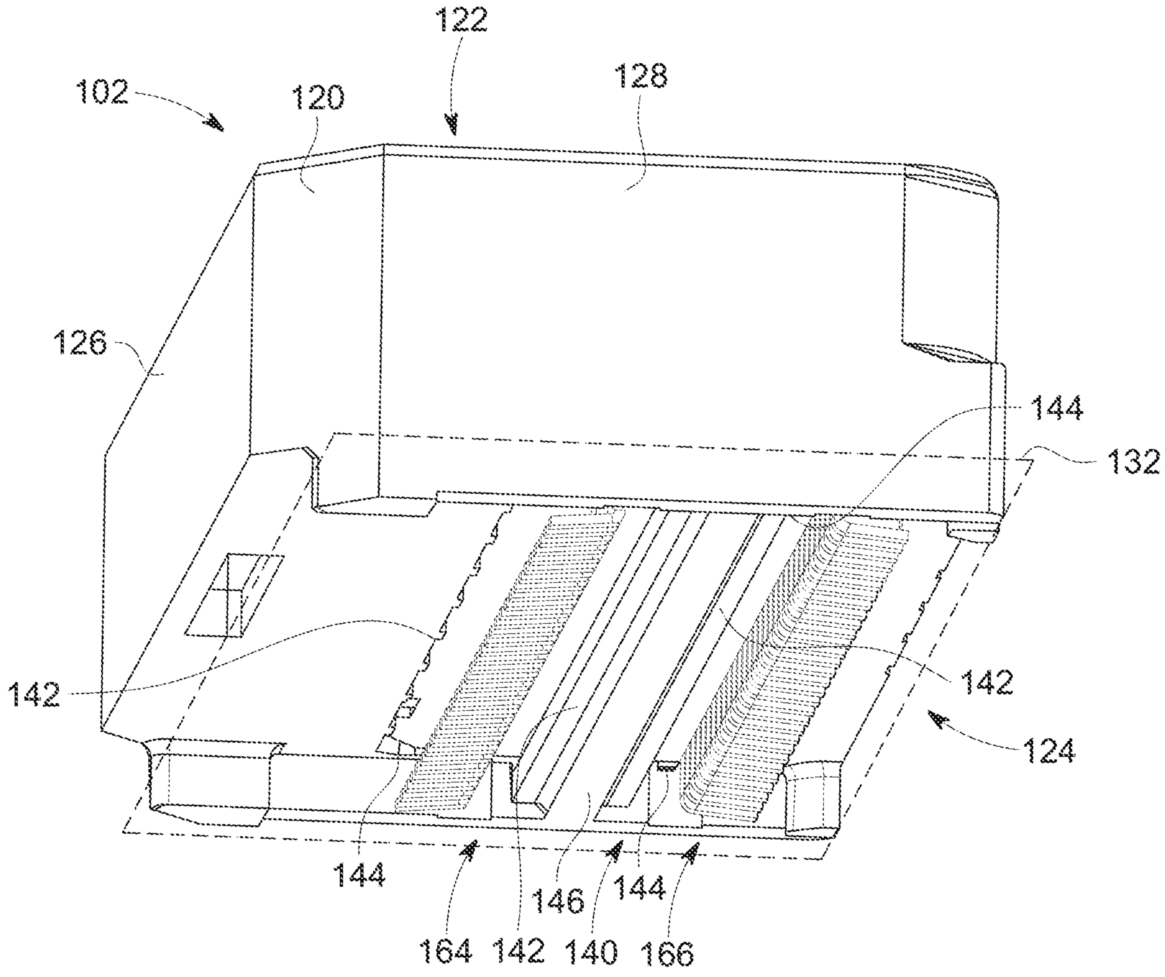
FIG. 7 is a perspective view from the bottom of the plug connector illustrating the surface mount tails of the signal and ground terminals extending therefrom.
Figure 8:
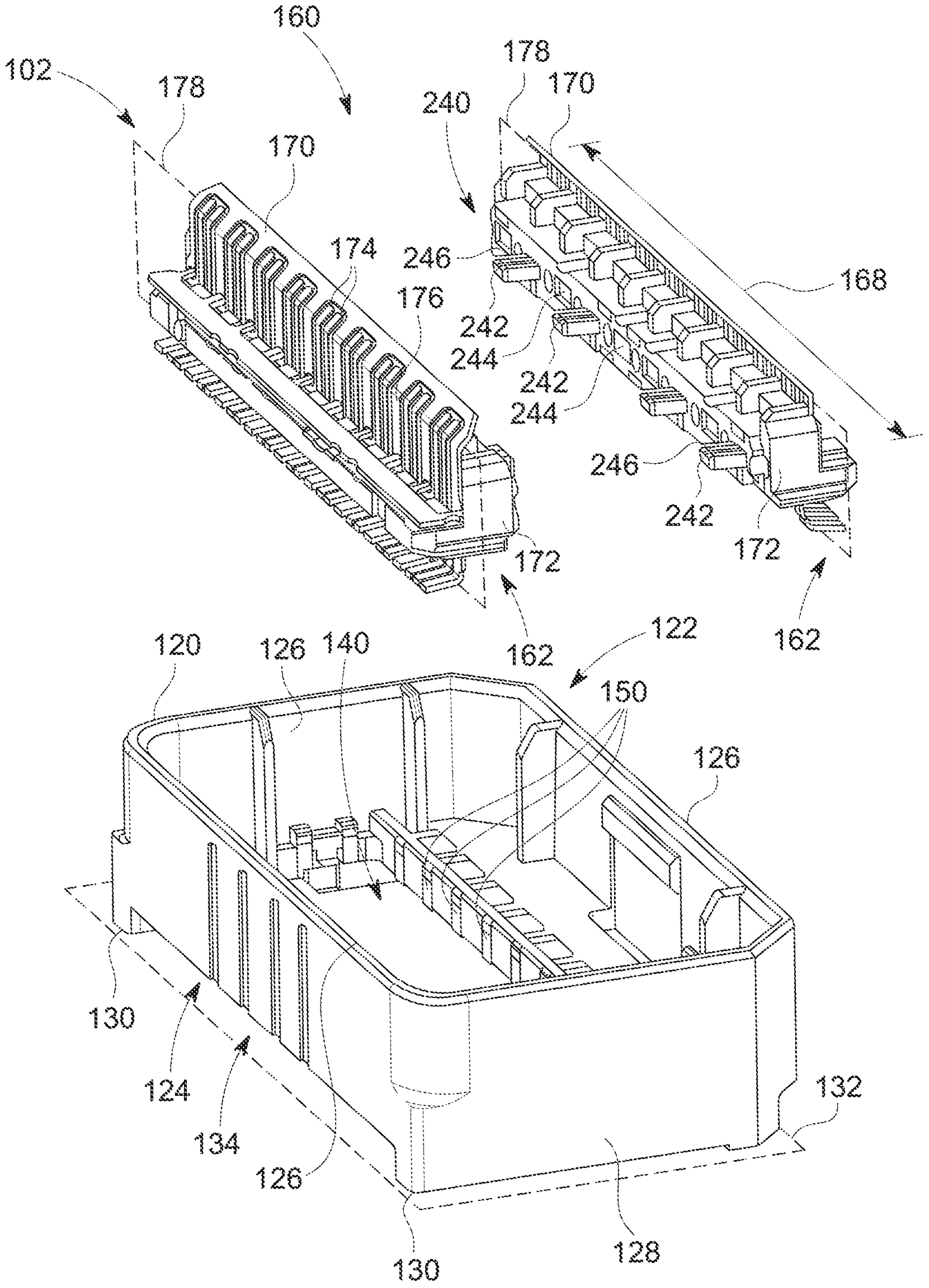
FIG. 8 is a perspective assembly view from above of the plug connector illustrating opposing terminal wafers of the terminal subassembly removed from the plug housing.
Figure 9:
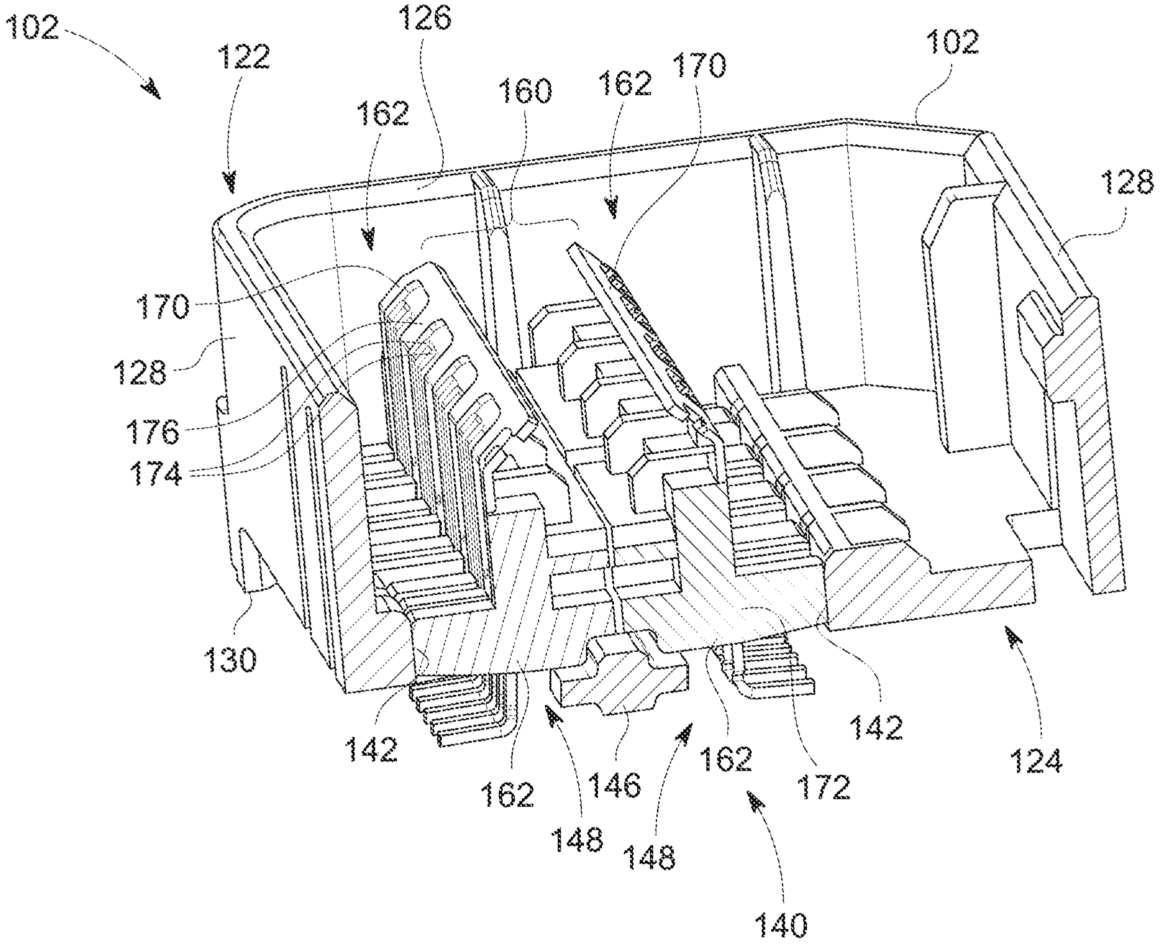
FIG. 9 is a cross-sectional perspective view of the plug connector, as taken along Line A-A of FIG. 6, illustrating the opposing terminal wafers of the terminal subassembly arranged in the plug housing.

As illustrated in FIGS. 7-9, an opening 140 can be disposed through the mounting face 124 of the plug housing 120 at a location offset from the longitudinal centerline of the housing. The opening 140 functions to receive and secure the terminal subassembly 160 in the plug connector 102. As a result, it may be understood that the terminal subassembly 160 is disposed within the plug housing 120 in an offset manner relative to the longitudinal center of the plug housing. The opening 140 is generally rectangular and is defined by spaced apart, elongated side edges 142 (corresponding to the elongated sidewalls 126) and spaced apart, shorter end edges 144 (corresponding to the shorter end walls 128) that are arranged orthogonally with each other. A central web 146 may extend across the opening 140 between the shorter end edges 144 and may be spaced apart from the elongated side edges 142. The opening 140 and the central web 146 that spans across it can have a lateral length extending within with the lateral length of the plug housing 120. The central web 146 can separate the opening 140 into two separate sub-openings 148 that extend parallel to each other and provide access to the interior of plug housing 120 through the mounting face 124. The central web 146 may be integrally molded as part of the plug housing 120.

Figure 10:
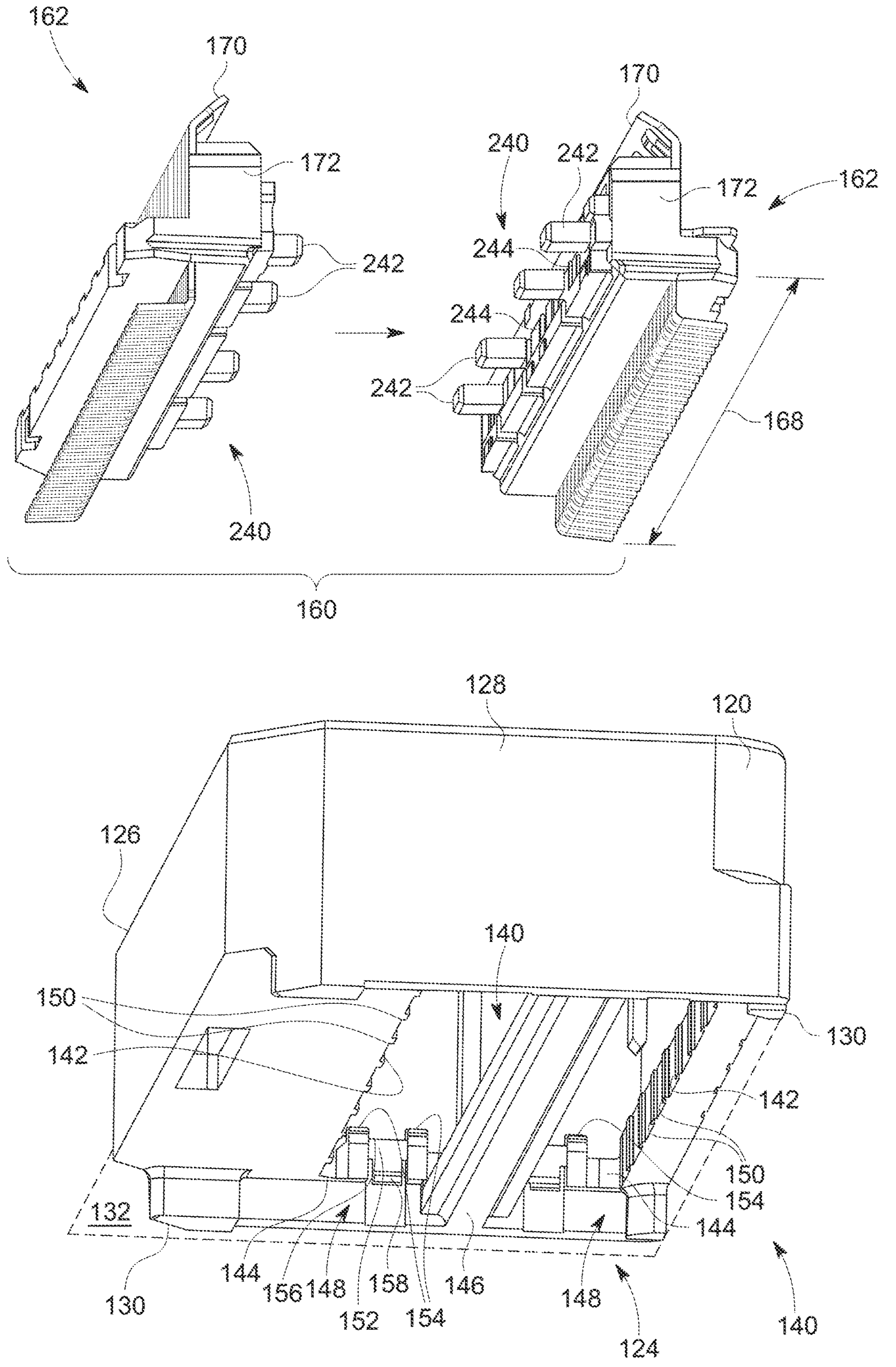
FIG. 10 is a perspective assembly view from below of the plug connector illustrating the opposing terminal wafers of the terminal subassembly removed from the plug housing.
Figure 11:
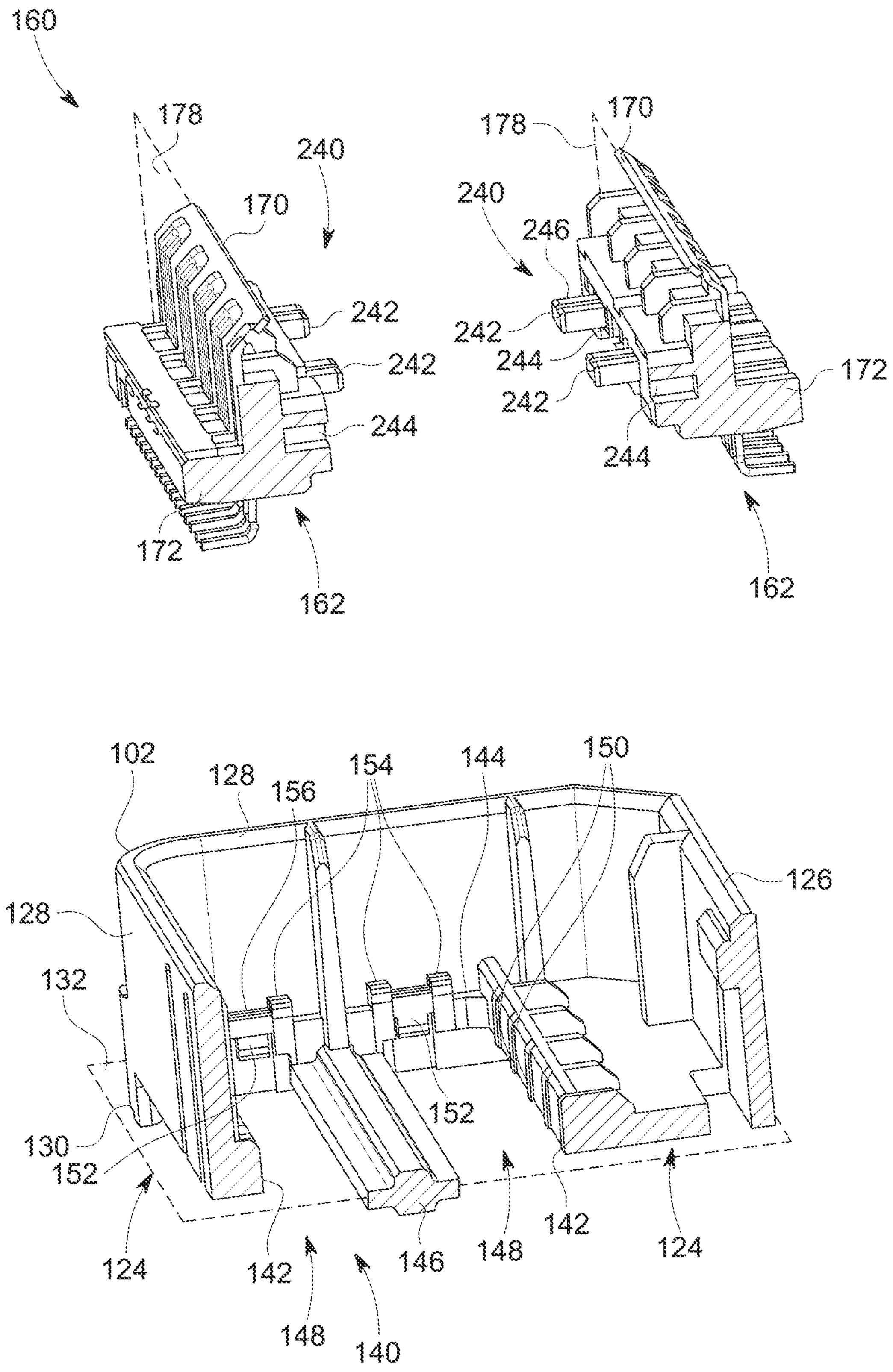
FIG. 11 is a cross-sectional assembly view of the plug connector, as taken along Line A-A of FIG. 6, illustrating the opposing terminal modules of the terminal subassembly removed from the plug housing.

To retain the terminal subassembly 160 in the plug housing 120, the plug housing can include retention structures to engage and position the terminal assembly within the opening 140. For example, as illustrated in FIGS. 10 and 11, the retention structures can include a plurality of ribs 150 that are integrally formed along the elongated side edges 142 of the opening 140. The plurality of ribs 150 can vertically traverse the height of the side edges 142 and be spaced apart from each other. The ribs 150 can protrude inwardly from the side edge 142 toward the central web 146 so that they extend partially into the opening 140.

As another example illustrated in FIGS. 10 and 11, the retention structures may include cantilevered latches arms 152 that are proximate the opening 140 disposed in the mounting face 124 and which may be located on the shorter end edges 144 that define the opening 140. The cantilevered latch arms 152 can be supported in a cantilevered manner between opposing first and second support legs 154 that extend vertically from the end edges 144 of the opening 140 and are integrally adjacent to the end walls 128 of the plug housing 120. The cantilevered latch arms 152 can be connected to the upward extending support legs 154 by a bridge spring 156 at the uppermost extent of the support legs 154. The bridge spring 156 can be in the form of a living hinge having resilient characteristics to enable spring-like cantilevered deflection of the cantilevered latch arm 152.

The cantilevered latch arm 152 can be oriented generally downwardly from the bridge spring 156 toward the opening 140 and may include at its distal end a barb or distal locking projection 158 oriented away from the end edge 144 and into the opening 140. To facilitate cantilevered deflection of the latch arm 152 with respect to the opening 140, the first and second support legs 154 may support the latch arm 152 in a spaced apart manner with respect to the end wall 128 of the plug housing 120. Thus, the downward distal locking projection 158 can deflect in a cantilevered manner towards and away from the end walls 128 of the plug housing 120 and with respect to the opening 140 defined in the mounting face 124. In embodiments in which the opening 140 is separated into first and second sub-openings 148 by the central web 146, a cantilevered latch arm 152 supported between a pair of first and second support legs 154 can be included for each sub-opening 148 so that at least two cantilevered latch arms 152 are associated with each end wall 128. In another embodiment, the cantilevered latch arms 152 and support legs 154 can be formed along the longer side edges 142 of the rectangular opening 140.

Referring to FIGS. 8-10, the terminal subassembly 160 can be formed from two elongated terminal modules or terminal wafers 162. In an embodiment, the terminal wafers 162 can be generally identical to each other and can form a hermaphroditic pair that can be interchangeably mated to each other when aligned in a parallel, opposing arrangement to build the terminal subassembly 160. When installed in the plug housing 120, the terminal assembly 160 may be generally disposed within the opening 140 through the mounting face 124 with each terminal wafer 162 positioned in one of the sub-openings 148 such that the terminal wafers may be situated over and separated by the cross-web 146. Accordingly, as shown in FIG. 7, the plug connector 102 can have a first row or column of inline terminal leads 164 and a parallel second row of column of inline terminal legs 166 that extend laterally with respect to the plug housing 120 and parallel to the elongated sidewalls 126. The parallel rows of inline terminal leads 164, 166 increase the density of communication channels that can be established by the connector assembly. To fit the terminal subassembly 160 within the plug housing 120, the terminal wafers 162 may have a lateral wafer length 168 that is generally coextensive with the opening 140.

As illustrated in FIGS. 8-13, each terminal wafer 162 can include a conductive terminal array 170 partially disposed in and supported a non-conductive terminal support molding 172. The terminal array 170 includes a plurality of signal or data terminals 174 for conducing data signals and a plurality of ground terminals 176. The signal and ground terminals 174, 176 can be disposed adjacent to each other in a side-by-side configuration so that the vertical extension of the terminals are aligned in a common array plane 178. In an embodiment, to transmit differential signaling, the signal terminals 174 can be arranged as terminal pairs that are disposed between adjacent ground terminals 176. Each pair of the signal terminal 174 can electrical couple together and can transmit a portion of the differential signal; however other configurations or patterns of signal and the ground terminals are contemplated. The terminal array 170 can be made from stamped and formed sheet metal with the planar signal and ground terminals 174, 176 stamped into a three-dimensional shape that is embedded or fit within the terminal support molding 172. The terminal support molding 172 can partially envelop the terminal array 170 to maintain the spacing between the signal and ground terminals 174, 176.

Figure 14:
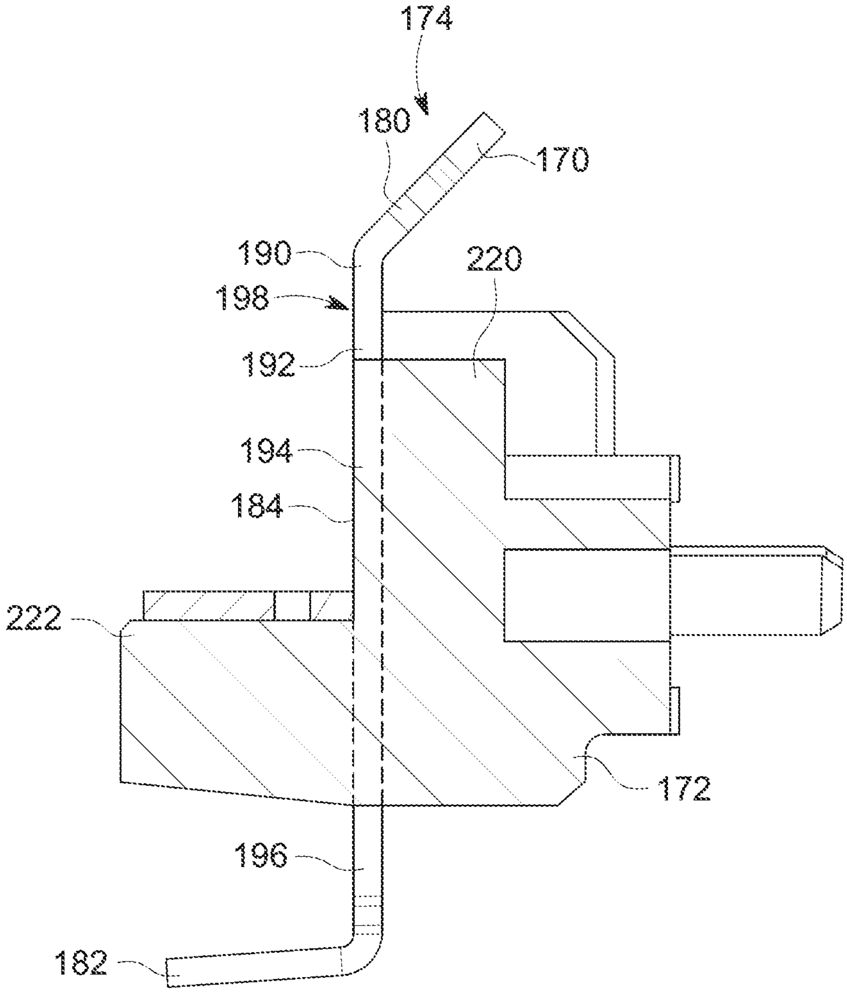
FIG. 14 is a cross-sectional elevational view of the terminal wafer as taken along Line A-A of FIG. 13 in between two signal terminals disposed in the terminal support molding.
Figure 16:
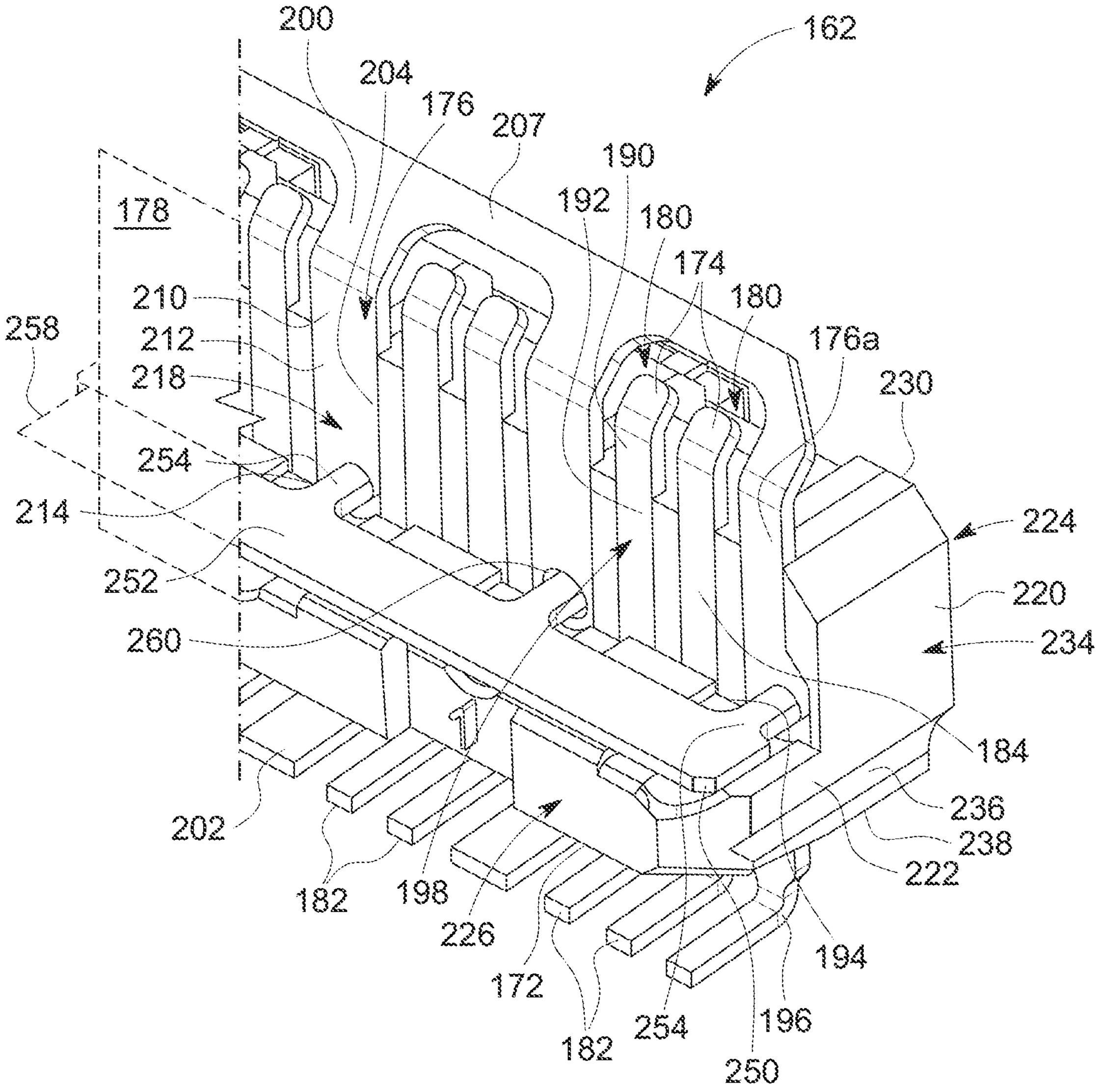
FIG. 16 is a perspective detailed view of a wafer end of the terminal wafer illustrating the signal and ground terminals disposed in the terminal support molding.

As illustrated in FIGS. 14 and 16, each signal terminal 174 can include a mating end 180, a mounting end 182 opposite the mating end 180, and a planar mid-body portion 184 extending between the mating end and mounting end. The mating end 180 is intended to slide against and make conductive contact with a corresponding signal terminal from the receptacle connector and therefore is formed as an angled end portion to guide and prevent stubbing with the corresponding terminal. The angled end portion of the mating end 180 can be offset at an angle of approximately 30° degrees with respect to the planar mid-body portion 184. To abut against a conductive pad on the substrate, the mounting end 182 is formed as a surface mount tail that is generally perpendicular to the planar mid-body portion 184 and projects in the opposite direction as the angled end portion at the mating end 180.

The planar mid-body portion 184, which is elongated and generally planar, includes, sequentially from the mating end 184 to the mounting end 182, a first cantilevered segment 190, a second mating segment 192, a third retention segment 194, and a four connecting segment 196. The cantilevered segment 190, which terminates at its distal end in the mating end 180, may be supported in the terminal support molding 172 in a manner that enables it to deflect to some extent when making sliding contact with a corresponding terminal of the receptacle connector. The mating segment 192 is partially embedded in the terminal support molding 172 and is exposed along a planar mating surface 198 to physically and conductively contact the corresponding terminal during mating of the plug connector 102 and receptacle connector 104. The retention segment 194 is fully embedded within the terminal support molding 172 to retain and support the signal terminal 174. The connecting segment 196 extends between the lower edge of the terminal support molding 172 and the mounting end 182 and may include an approximate 90° degree bend to project the surface mount tail at the mounting end orthogonally with respect to the planar mid-body portion 184.

Figure 15:
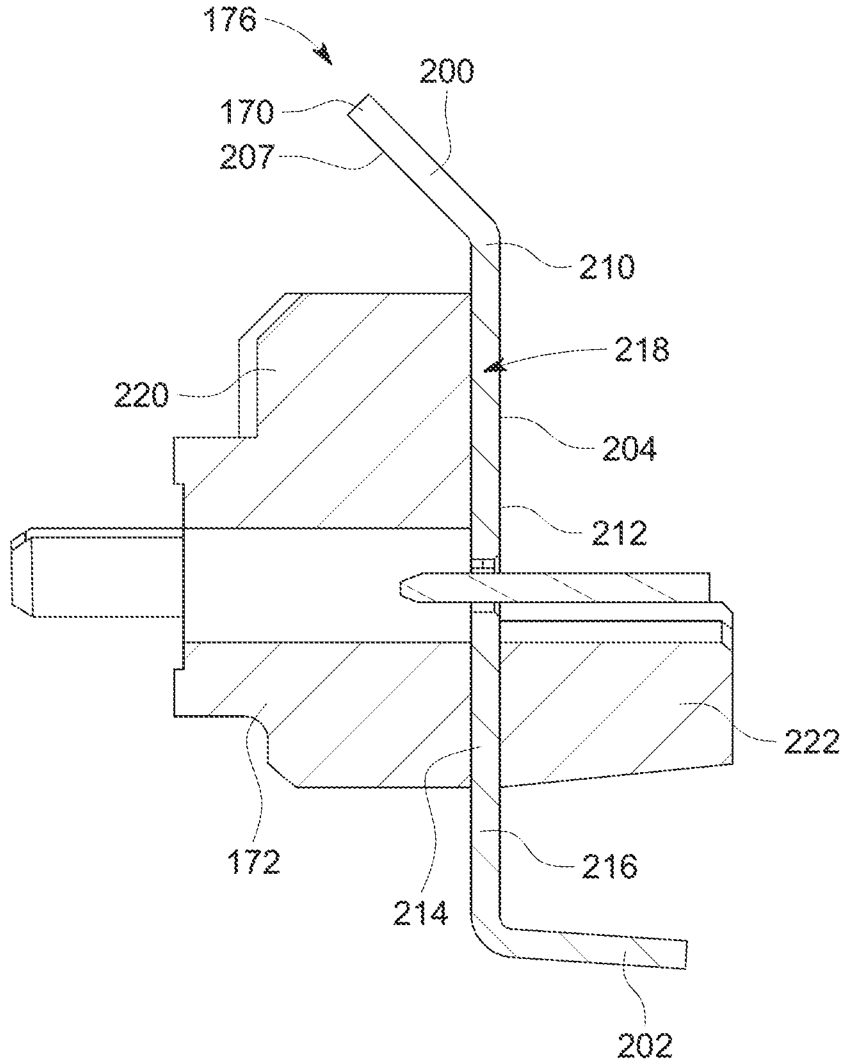
FIG. 15 is a cross-sectional elevational view of the terminal wafer as taken along Line B-B of FIG. 13 through a ground terminal disposed in the terminal support molding.

As illustrated in FIGS. 15 and 16, each ground terminal 176 can include a mating end 200, a mounting end 202 opposite the mating end 200, and a planar mid-body portion 204 extending between the mating end and the mounting end. The mating end 200 is intended to slide against and make conductive contact with a corresponding ground terminal from the receptacle connector and therefore can be formed as an angled end portion to guide and prevent stubbing with the corresponding terminal. The angled end portion forming the mating end 200 can be offset at an angle of approximately 30° degrees with respect to the planar mid-body portion 204. In an embodiment, the plurality of ground terminals 176 included in the terminal array 170 can be interconnected with each other by an upper grounding bridge or rail 207 that extends along and connects the mating ends 200 of each around terminal 176. More specifically, the upper grounding rail 207 is integrally formed with and extends in the same plane as the mating ends 200 to electrically connect each of the around terminals 176 at their mating ends 200. To abut against a conductive ground pad on the substrate, the mounting end 204 of the around terminal 176 can be formed as a surface mount tail that is generally perpendicular to the planar mid-body portion 204.

The planar mid-body portion 204, which is elongated and generally planar, includes, sequentially from the mating end 200 to the mounting end 202, a first cantilevered segment 210, a second mating segment 212, a third retention segment 214, and a fourth connecting segment 216. The cantilevered segment 210, which terminates at its distal end in the mating end 200, may be supported in the terminal support molding 172 in a manner that enables it to deflect to some extent when making sliding contact with a corresponding terminal of the receptacle connector. The mating segment 212 is partially embedded in the terminal support molding 172 and is exposed along a planar mating surface 218 to physically and conductively contact the corresponding terminal during mating of the plug connector 102 and receptacle connector 104. The retention segment 214 is fully embedded within the terminal support molding 172 to retain and support the ground terminal 176. The connecting segment 216 extends between the lower edge of terminal support molding 172 and the mounting end 202 and may include an approximate 90° degree bend to project the surface mount tail at the mounting end orthogonally with respect to the planar mid-body portion 204.

As illustrated in FIGS. 14-16, each ground terminal 176 is substantially wider along the plane 178 of the terminal array 170 as compared to the signal terminals 174. Specifically, the planar mid-body portion 204 of each ground terminal 176 can be wider than the corresponding planar mid-body portion 184 of each signal terminal 174. Other than the two ground terminals **176*a* at the ends of the terminal wafers 162, the ground terminals 176 are substantially wider than the signal terminals 174 along their entire vertical length. As stated above, each terminal array 170 can be formed from stamped sheet metal and is generally planar except for at the mating and mounting ends. The planar mid-body portions 184 of the signal terminals 174 and the planar mid-body portions 204 of the ground terminals 176 can be aligned with the common array plane 178 of the terminal array 170**.

As illustrated in FIGS. 14-16, the terminal support molding 172 of each terminal wafer 162 is generally L-shaped and can include a vertical leg 220 and a horizontal leg 222 disposed at a right angle with the vertical leg 220. The vertical leg 220 can delineate a rear surface 224 of the terminal support molding 172 and the horizontal leg 222 can delineate a forward surface 226 of the terminal support molding 172 with the distance between the rear and forward surfaces 224, 226 defining the width or thickness of the terminal wafer 162. The vertical leg 220 extends adjacent to the rear of and partially surrounds the mating segment 192 of each signal terminal 174 and the mating segment 202 of each ground terminal 176 on three sides so the signal and around terminals 174, 176 remain exposed along their respective mating surfaces 198, 218. The retention segment 194 of each signal terminal 174 and the retention segment 214 of each ground terminal 176 are surrounded and fully embedded in the horizontal leg 222 of the terminal support molding 172 so that the signal terminals 174 and ground terminals 176 are secured as part of the terminal wafer 162. In an embodiment, the terminal support molding 172 can be made of non-conductive thermoplastic insert molded or over-molded about the stamped and formed terminal array 170 by an appropriate manufacturing process. In other embodiments, the terminal support molding 172 can be molded separately from the terminal array 170 and the signal and ground terminals 174, 176 can be assembled into the terminal support molding.

Figure 12:
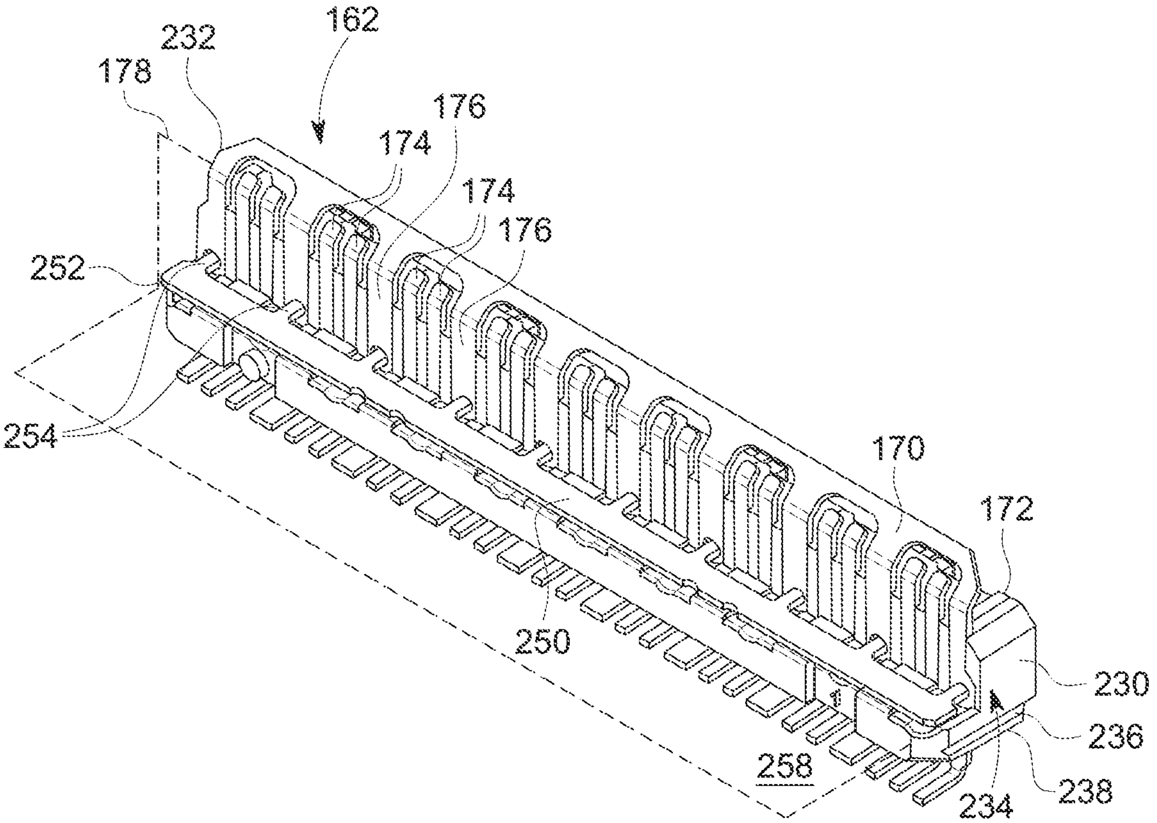
FIG. 12 is a perspective view of a terminal wafer of the terminal subassembly of the plug connector including signal and ground terminals disposed in a terminal support molding.
Figure 13:
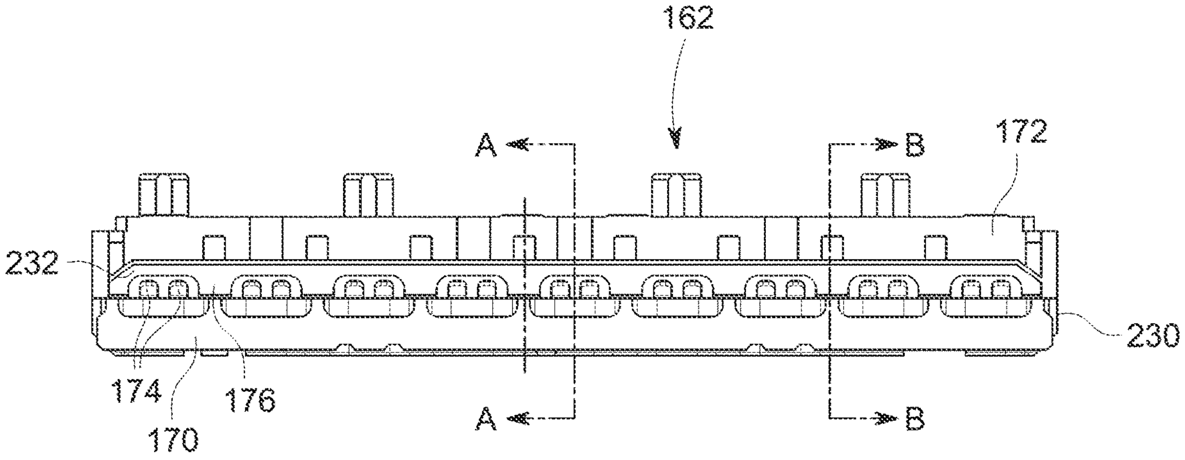
FIG. 13 is a top plane view of the terminal wafer including signal and around terminals disposed in a terminal support molding.

The terminal subassembly 160 can include retention features to cooperatively interact with the corresponding retention features on the plug housing 120. For example, as illustrated in FIGS. 12, 13, and 16, the terminal wafers 162 can extend between a first wafer end 230 and second wafer end 232 separated by the length of the terminal wafer and that are delineated by opposing end surfaces 234 of the terminal support molding 172. To engage the cantilevered latch arms of the plug housing, a first latch recess 236 and a second latch recess 238 can be disposed into the end surfaces 234 of terminal support molding 172 proximate with the horizontal lea 222. The first latch recess 236 and the second latch recess 238 can extend between the rear surface 224 and the forward surface 226 of the terminal support molding 172 so they traverse the width of the terminal wafer 162. The first latch recess 236 can extend into the end surfaces 234 of the terminal support molding 172 and can be shaped as a triangular groove or V-channel. The second latch recess 238 can be located below the first latch recess 236 can be formed at the lower corner of the end surfaces 234 and can be shaped as a chamfer. As described below, the first recess 236 and the second recess 238 can act as detents when engaging the cantilevered latch arms 152 on the plug housing 120.

As illustrated in FIGS. 8-11, the terminal wafers 162 can be hermaphroditic and configured to interlock together as a pair to assemble the terminal subassembly 160. To provide the hermaphroditic configuration, the terminal support moldings 172 can be identical to each other and can include complementary locking structures 240 formed along the rear surface 224 of the vertical leg 220. The locking structures 240 can include a plurality of posts 242 that extend horizontally from the rear surface 224 in the opposite direction of the horizontal leg 222. The plurality of posts 242 are laterally spaced apart from each along the length of the terminal support molding 172. The locking structures 240 can also include a plurality of recesses 244 disposed into the rear surface 224 of the vertical leg 220 that is complementary in shape to the posts 240 and that are laterally spaced apart along the length of the terminal support molding 172. The number and configuration of the posts 242 can correspond to the number and configuration of the recesses 244. When two identical terminal wafers 162 are symmetrically placed in an opposing, parallel relation with the rear surfaces 224 of their respective vertical legs 220 adjacent each other, the plurality of posts 242 can be received in the respective plurality of recesses 244. In an embodiment where a pair of terminal wafers 162 are interlocked or press fit together to form the terminal subassembly 160, a crush rib 246 can be formed along a surface of each of the posts 240. When the post 242 is inserted into the corresponding recess 244, the crush rib 246 may contact and be displaced by the interior surface of the recess forming a secure interlocking fit between the pair of terminal wafers 162 of the terminal subassembly 160.

In an aspect of the disclosure illustrated in FIGS. 12 and 16-18, an electrically conductive ground bar 250 can mechanically and electrically connect with the ground terminal 176 of the terminal array 170. The ground bar 250 can be flat and generally planar and can include an elongated, common spine 252 that is generally coextensive with the lateral length of the terminal array 170. Projecting from the common spine 252 can be a plurality of prong-like blades 254 that can be spaced apart from each other along the common spine 252. The tips 256 of the blades may be tapered or pointed at their distal ends. The blades 254 are flat and may be laterally wider than they are thicker with upper and lower surfaces that are co-planar with the upper and lower surfaces of the common spine 252; however in other embodiments, the blades may have different shapes. The common spine 252 and the plurality of blades 254 may be aligned in a common blade plane 258. When assembled the ground bar 250 is assembled to the terminal wafer 162, the blade plane 258 is perpendicular to the common array plane 178 of the signal and ground terminals 174, 176. The grounding bar 250 can be made by stamping a conductive metallic material.

To mechanically and electrically connect with the ground bar 250, the ground terminals 176 of the terminal array 170 can include an aperture 260 disposed into the planar mid-body 204 of each ground terminal. The apertures 260 can extend partially or completely through the planar mid-body portion 204 normal to the common array plane 178. The apertures 260 can be disposed in the planar mid-body portion 204 vertically above the horizontal leg 222 of the terminal support molding 172 so that the aperture 260 is exposed along the exposed planar mating surface 218 of the around terminal 176. The blades 254 may project from the common spine 252 a sufficient distance to extend through the planar mid-body portion 204 of the ground terminal 176 and may be received partially into the vertically leg 220 of the terminal support molding 172 adjacent the terminal array 170. The aperture 260 can have any shape; however, in a particular embodiment, the apertures 260 may be oval or elliptical to form elongated slots. The apertures 260 therefore can have a major axis 262 aligned with the dimension of the oval or elliptical shape. The width and thickness of the aperture 260 can be approximately the same as the width and thickness of the blades 254 so that the aperture and blade are generally complementary in dimension.

Figure 17:
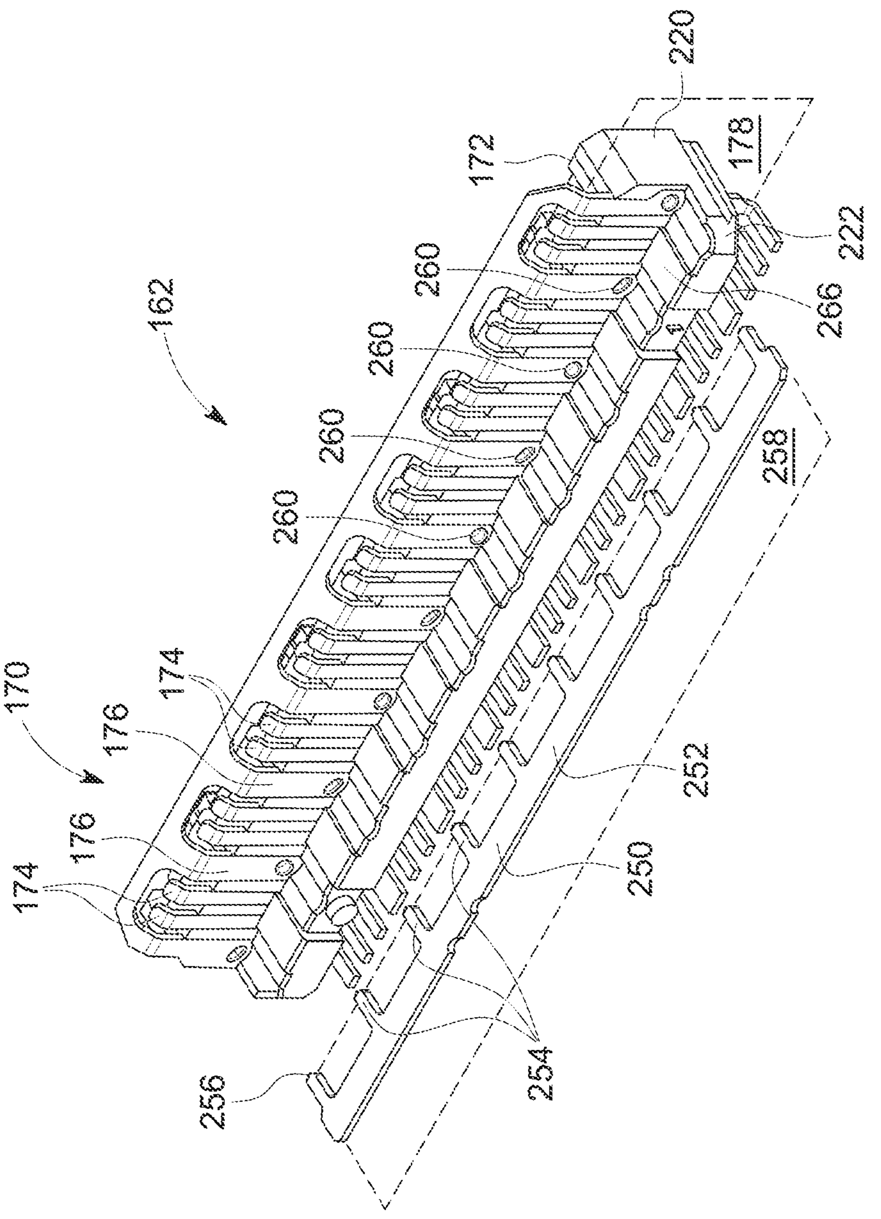
FIG. 17 is a perspective view of the terminal wafer of the terminal subassembly illustrating mechanical and electrical connection between the ground terminals and a ground bar.
Figure 18:
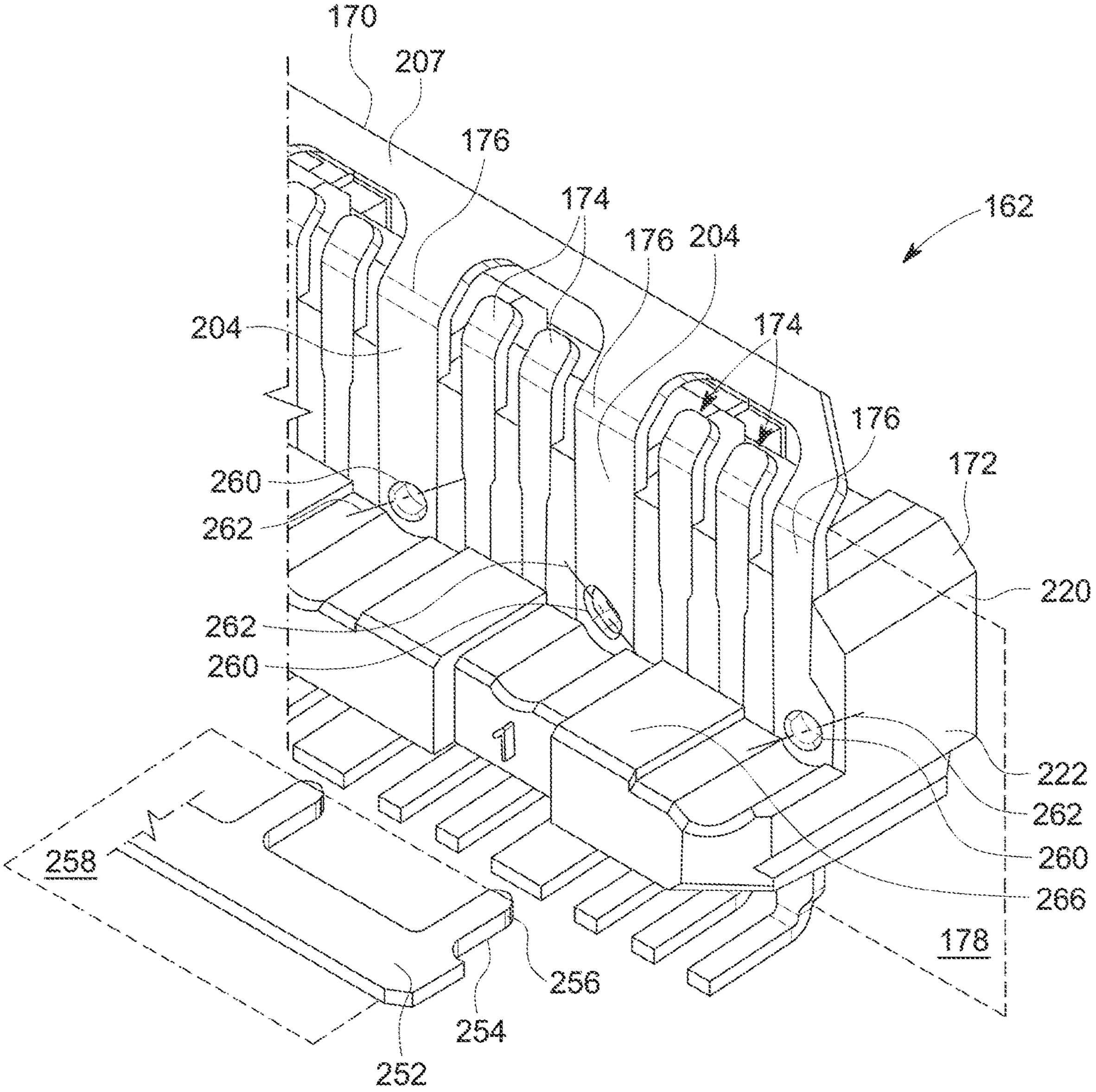
FIG. 18 is a perspective detailed view of a wafer end of the terminal wafer of the terminal subassembly illustrating mechanical and electrical connection between the ground terminal and the around bar.

In an embodiment, however, the apertures 260 of the ground terminals 176 and the blades 254 of the ground bar 250 may be non-complementary in alignment and are configured to distort the blades with respect to the blade plane 258. The major axis 262 of the apertures 260 may be disposed at a non-perpendicular and non-parallel angle with respect to the vertical extension of the planar mid-body portion 204 of the ground terminal 276. The apertures 260 therefore appear slanted or skewed with respect to the lateral and vertical extension of the terminal array 170 as illustrated in FIGS. 17-18. Moreover, the offset angles of the major axes 262 of the apertures 260 may alternate between adjacent ground terminals 176 within the terminal array 170. For example, if the major axis 262 of an aperture 260 is tilted or offset 45° degrees clockwise with respect to the vertical extension of one ground terminal 176, the aperture 260 of the adjacent ground terminal 176 may be tilted or offset 45° degrees counter-clockwise. A possible advantage of alternating the offset angles of the major axes 262 of the apertures 260 is that it may balance the torsional forces applied between the terminal array 170 and the ground bar 250 caused by twisting and distortion of the blades 254. In other embodiments, the non-complementary alignment between the blades and apertures can be provided by other arrangements such as offset legs as described below or by non-complementary shapes or outlines of the blades and apertures such as circles, squares, and/or diamonds or by disposing the apertures in a non-perpendicular direction through the ground terminals.

To mechanically and electrically interconnect the ground bar 250 and the terminal array 170, the around bar 250 and the terminal wafer 162 are positioned so that the plurality of blades 250 are aligned with the plurality of apertures 260. The grounding bar 250 is directed perpendicularly toward the terminal array 170 so the projecting blades 254 enter the apertures 260. To assist in alignment, the horizontal leg 222 of the terminal support molding 172 extending forward of the terminal array 170 and perpendicular to the common array plane 178 can function as an upper shelf surface 266 to support the blades 254 of the ground bar 250. Upon inserting the blades 254 into the oval apertures 260, the angled major axes 262 will cause the blades 254 to contact the slanted inner perimeter of the apertures to rotate or twist the blades 254 with respect to the blade plane 258. The material and thickness of the ground bar 250 can be selected to facilitate or enable distortion of the blades 254. The torsional force caused by rotation of the blades 254 in the respective apertures 260 provide good mechanical and electrical contact between the ground bar 250 and each of the ground terminals 176 in that the ground bar and ground terminals are unlikely to disengage and while maintaining good conductivity. A possible advantage of establishing electrical conduction between the plurality of ground terminals 176 through the ground bar 250 is that the electrical path between the mating ends and mounting ends of the ground terminals is shortened, which can advantageously affect resonance frequencies in the ground circuit. In an embodiment, adhesive may be used to assist in securing the terminal array 170 and the grounding bar 250.

Figure 19:
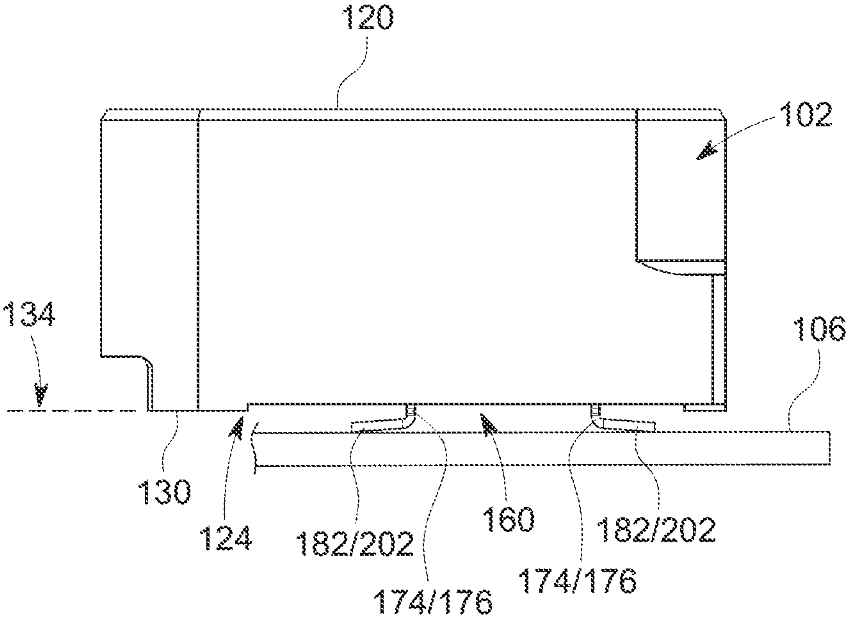
FIG. 19 is a side elevational view of the plug connector mounted to the substrate in a first operational position.
Figure 20:
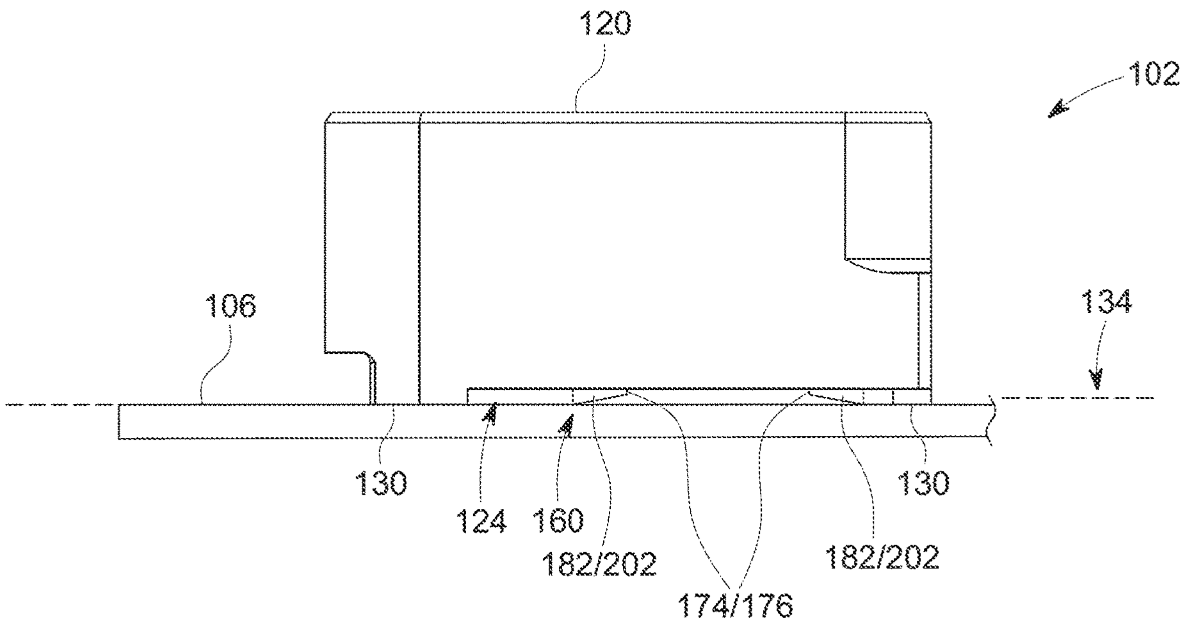
FIG. 20 is a side elevational view of the plug connector mounted to the substrate in a second operational position.

In an aspect of the disclosure illustrated in FIGS. 19-20, the plug housing 120 and the terminal subassembly 160 can be selectively moved between a first operational position for shipping and mounting the plug connector 102 to the substrate and a second operational position once the plug connector has been mounted to the substrate. As illustrated in FIG. 19, in the first operational position, the plug housing 120 and the terminal subassembly 160 are relatively positioned so that the mounting ends 182 of the signal terminals 174 and the mounting ends 202 of the ground terminals 176 extend below the mounting plane 132 associated with the mounting face 124 of the plug housing 120. In the first operational position, the mounting ends 182, 202 of the respective signal terminal 174 and ground terminals 176, which may be surface mount tails as described herein, are aligned in a plane spaced apart and below the mounting plane 132 associated with the mounting face 124. As illustrated in FIG. 20, in the second operational position, the plug housing 120 and the terminal subassembly 160 are moved relative to each other so that the standoffs 130 contact the substrate 106 and the plane of the mounting ends 182, 202 is coplanar with the mounting plane 134 associated with the mounting face 124. As illustrated, the gaps 134 separating the standoffs 130 remain present above the substrate 106 so that adhesive can be directed through the gaps to adhesively secure the plug connector 102 to the substrate. A possible advantage of configuring the plug connector 102 to move between the first operational position to the second operational positon is that the first operational position facilitates soldering of the mounting ends 182, 202 to the substrate while the second operational position reduces the vertical profile of the plug connector 102.

To facilitate moving or shifting between the first and second operational positions, the retention features on the plug housing 120 and the terminal subassembly 160 can be selectively engaged and released. As illustrated in FIGS. 8-11, to initially assemble the plug connector 102, the terminal subassembly 160, which can be assembled from interlocked hermaphroditic first and second terminal wafers 162, can be positioned above the plug housing 120 with the first and second terminal wafers aligned with the sub-openings 148. The terminal subassembly 160 is received in the opening 140 and the terminal wafers 162 are accommodated in the sub-openings 148 separated by the cross-web 146. The horizontal leg 222 of the terminal support molding 172 may span the width of the sub-openings 148 to retain and possibly form an friction fits with the terminal wafer 162 with the ribs 150 disposed about the opening 140.

Figure 21:
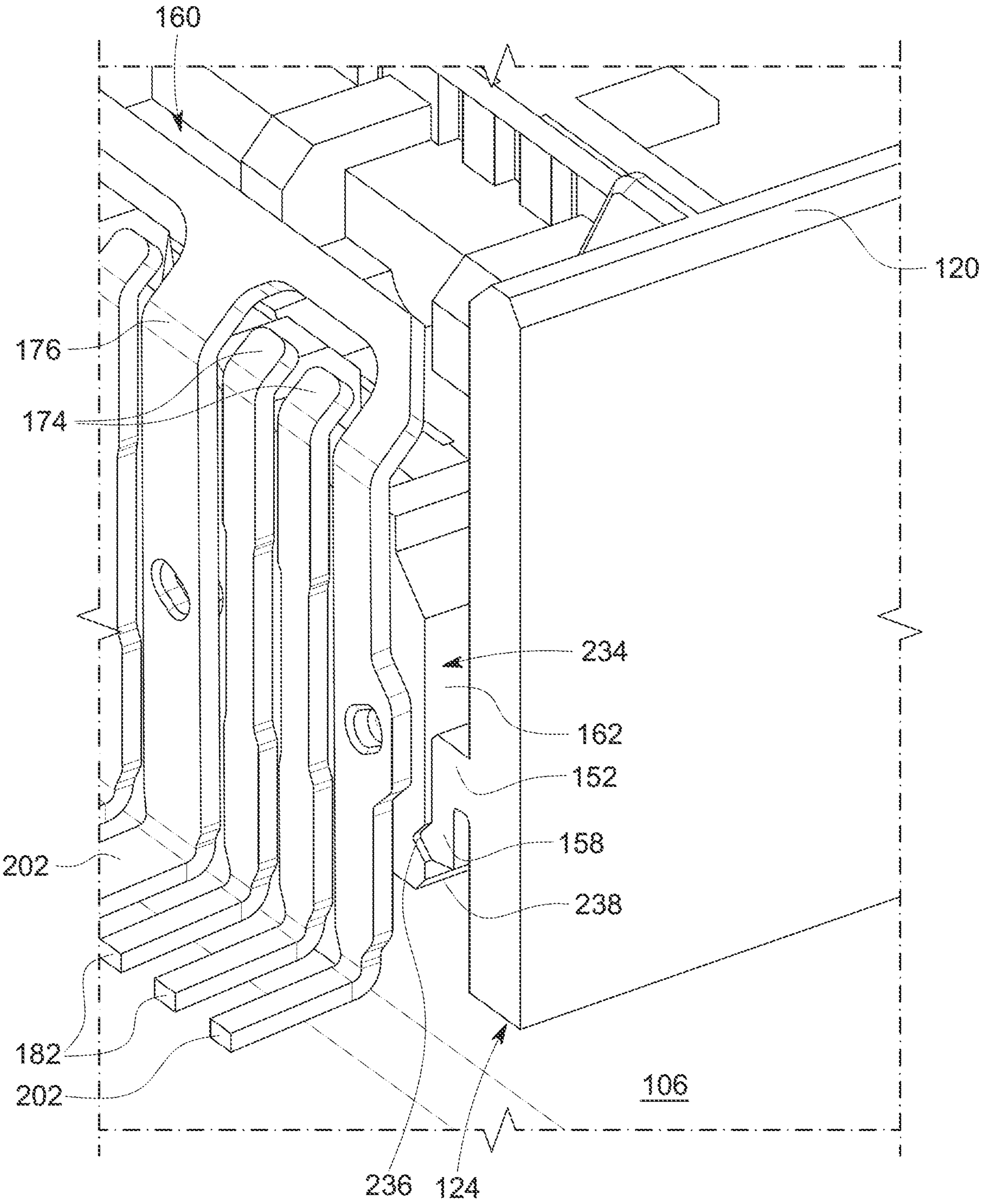
FIG. 21 is a perspective detailed view of the plug connector with a portion of the plug housing removed to illustrate the first operational position of the plug housing and the terminal subassembly.

To achieve and maintain the first operational position during shipping and soldering, as illustrated in FIGS. 19-21, the terminal subassembly 160 is moved downwardly with respect to the plug housing 120 so that the cantilevered latch arm 152 deflects toward the end wall 128 of the plug housing. The lower chamfered second latching recess 238 can slide past and deflect the latching protrusion 158, which slides vertically with respect to the end surface 234 of the terminal support molding 172 until the cantilevered arm 152 urges the latching protrusion into the V-channeled first latching recess 236. The first latching recess 236 functions as a detent catching the latching protrusion 158 of the cantilevered latch arm 152 to maintain the first operational position. The plane of the mounting ends 182, 202 of the respective signal terminals 174 and ground terminals 176 are spaced apart and below the mounting plane 132 associated with the mounting face 124 of the plug housing 120.

Figure 22:
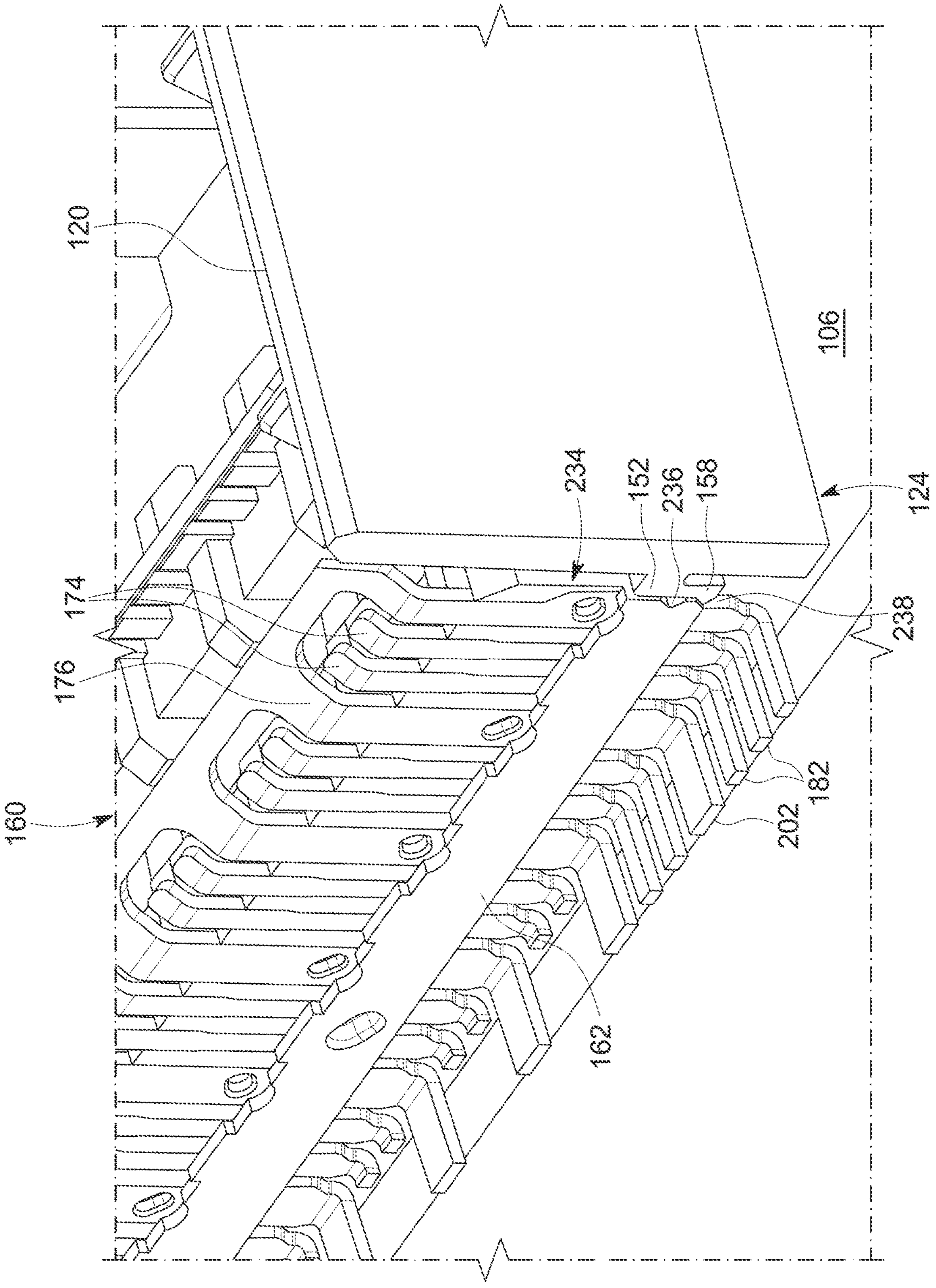
FIG. 22 is a perspective detailed view of the plug connector with a portion of the plug housing removed to illustrate the first operational position of the plug housing and the terminal subassembly.

To move the housing plug 120 and terminal subassembly 160 to the second operational position, as illustrated in FIGS. 20 and 22, the plug housing 120 is moved downwardly with respect to the terminal subassembly 160 so that the cantilevered latch arm 152 deflects toward the end wall 128 of the plug housing. The V-channeled first latch recess 236 displaces and releases the latching protrusion 158 that slides vertically with respect to the end surface 234 of the terminal support molding 172 until the cantilevered latch arm 152 urges the latching protrusion into the lower second latch recess 238. The plane of the mounting ends 184, 204 of the respective signal terminals 174 and ground terminals 176 is now coplanar with the mounting plane 132 associated with the mounting face 124 of the plug housing 120. In embodiments with standoffs 130, adhesive can be directed though the gaps 134 delineated between the standoffs to adhesively secure the plug connector 102 to substrate 106. In an embodiment, the location of the cantilevered latch arms 152 and the first and second latching recesses 236, 238 may be reversed with the cantilevered latch arms on the terminal subassembly 160 and recesses disposed in the plug housing 120.

Figure 23:
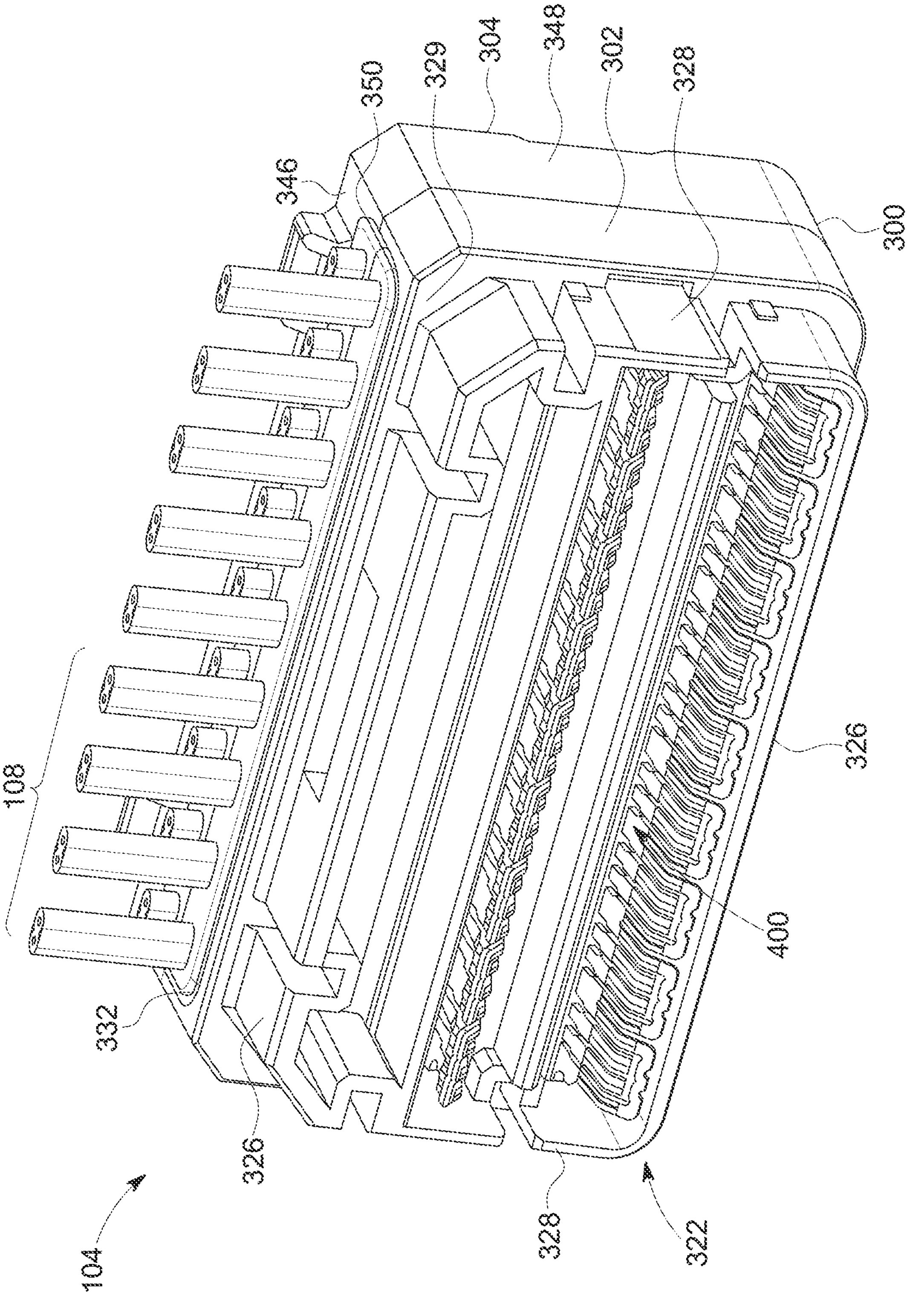
FIG. 23 is a perspective view from below of an embodiment of a receptacle connector of FIG. 1 illustrating the receptacle housing and the terminal subassembly therein.
Figure 24:
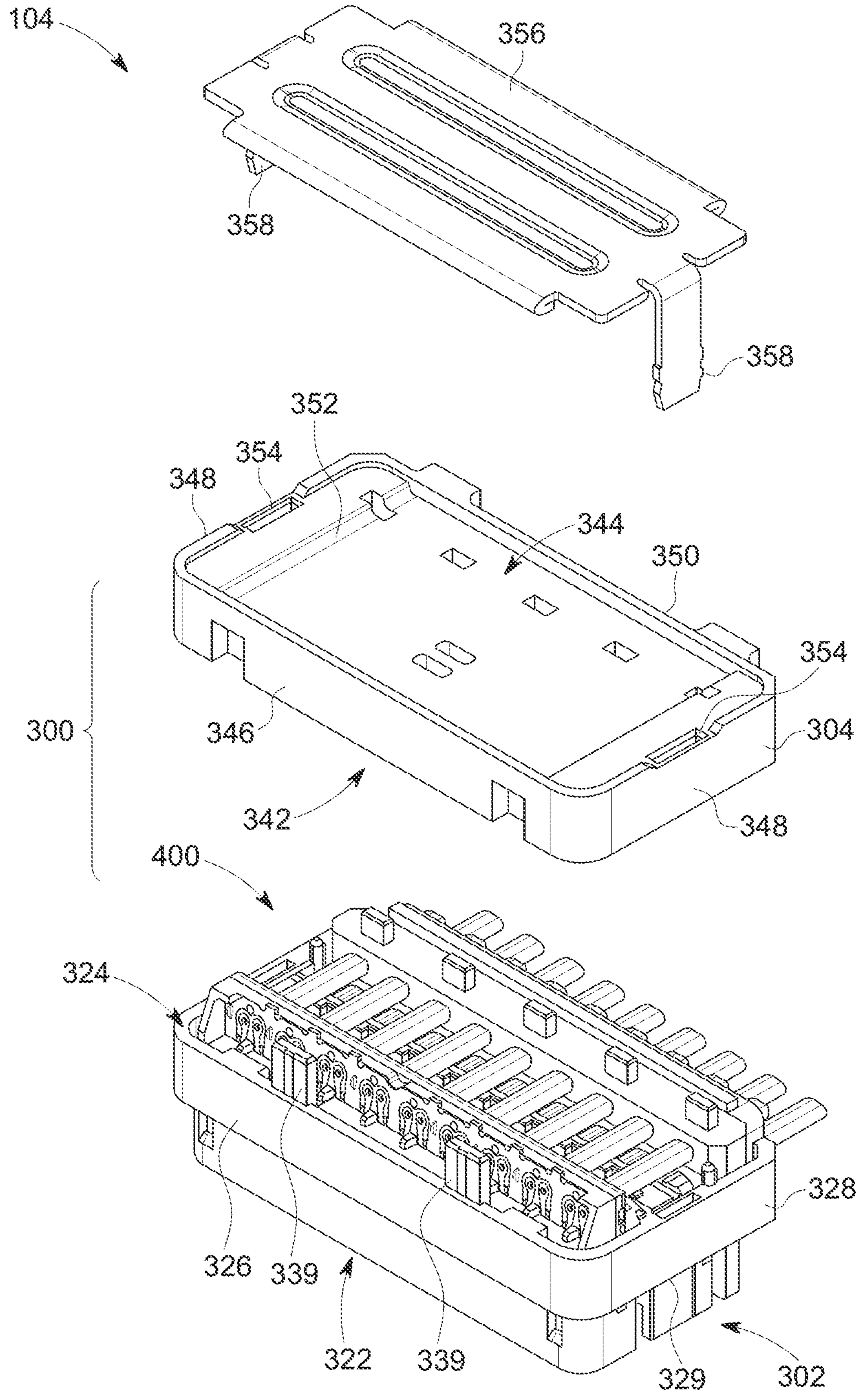
FIG. 24 is a perspective assembly view from above of the receptacle connector illustrating the lower and upper housing components in an unassembled state.

Referring to FIGS. 23-24, the receptacle connector 104 includes a receptacle housing 300 made of non-conductive material such as molded thermoplastic and a terminal subassembly 400 that makes conductive connection with the plurality of electrically conductive cables 108. The receptacle housing 300, which may also be referred to as an insulator housing for its non-conductive properties, can include a lower housing component 302 and an upper housing component 304 also made of non-conductive material such as molded plastic. The lower housing component 304 has a lower mating face 322 and an assembly face 324 spaced apart from and parallel to the mating face 322. The lower housing 302 is generally rectangular in shape and includes two parallel, longer sidewalls 326 and two parallel shorter end walls 328 that are orthogonal to the sidewalls 316 to delineate a rectangular shape. The sidewalls 326 and end walls 328 of the lower housing 302 are integral to each other and can delineate an enclosure or shell that accommodates the terminal subassembly 400. The sidewalls 326 and the end walls 328 can have a stepped configuration so that the mating face 322 has a reduced outline with respect to the assembly face 324 and provides a shoulder 329 that can abut against the corresponding mating face of the plug connector.

Figure 25:
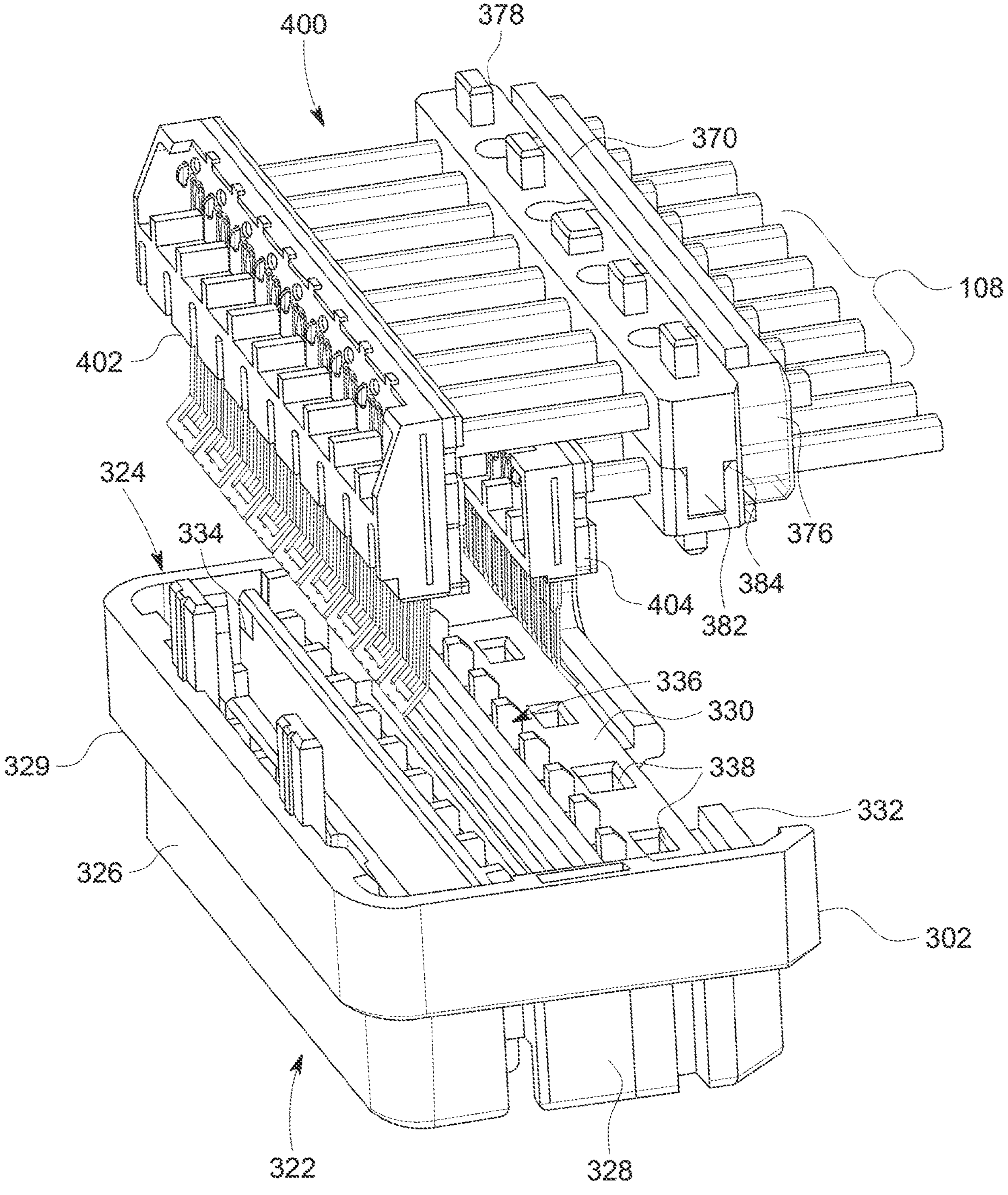
FIG. 25 is perspective assembly view from above illustrating the lower housing of the receptacle connector with the terminal subassembly removed therefrom.
Figure 26:
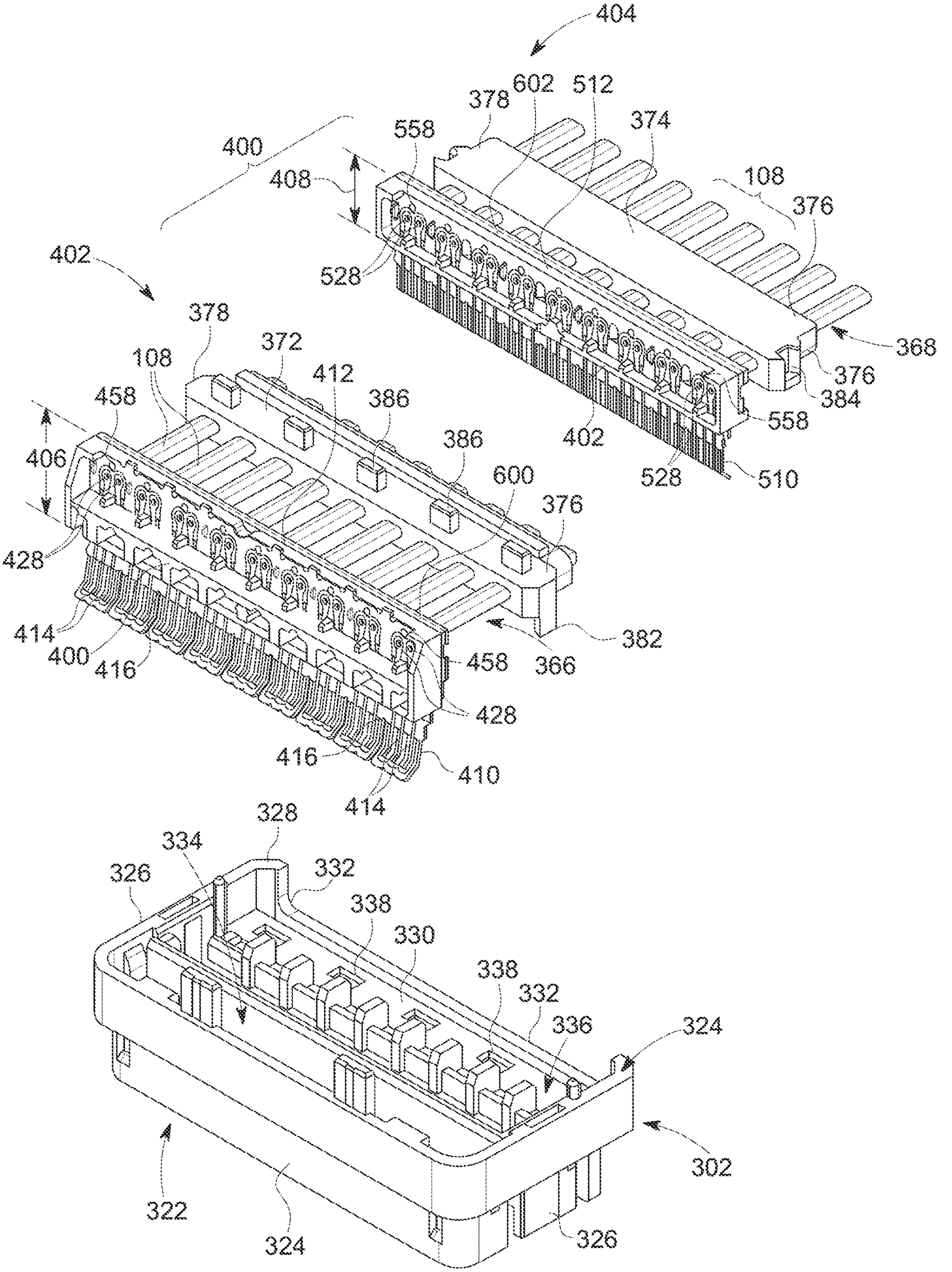
FIG. 26 is a perspective assembly view from above illustrating the lower housing of the receptacle connector with the terminal subassembly including a first terminal wafer and second terminal wafer.
Figure 27:
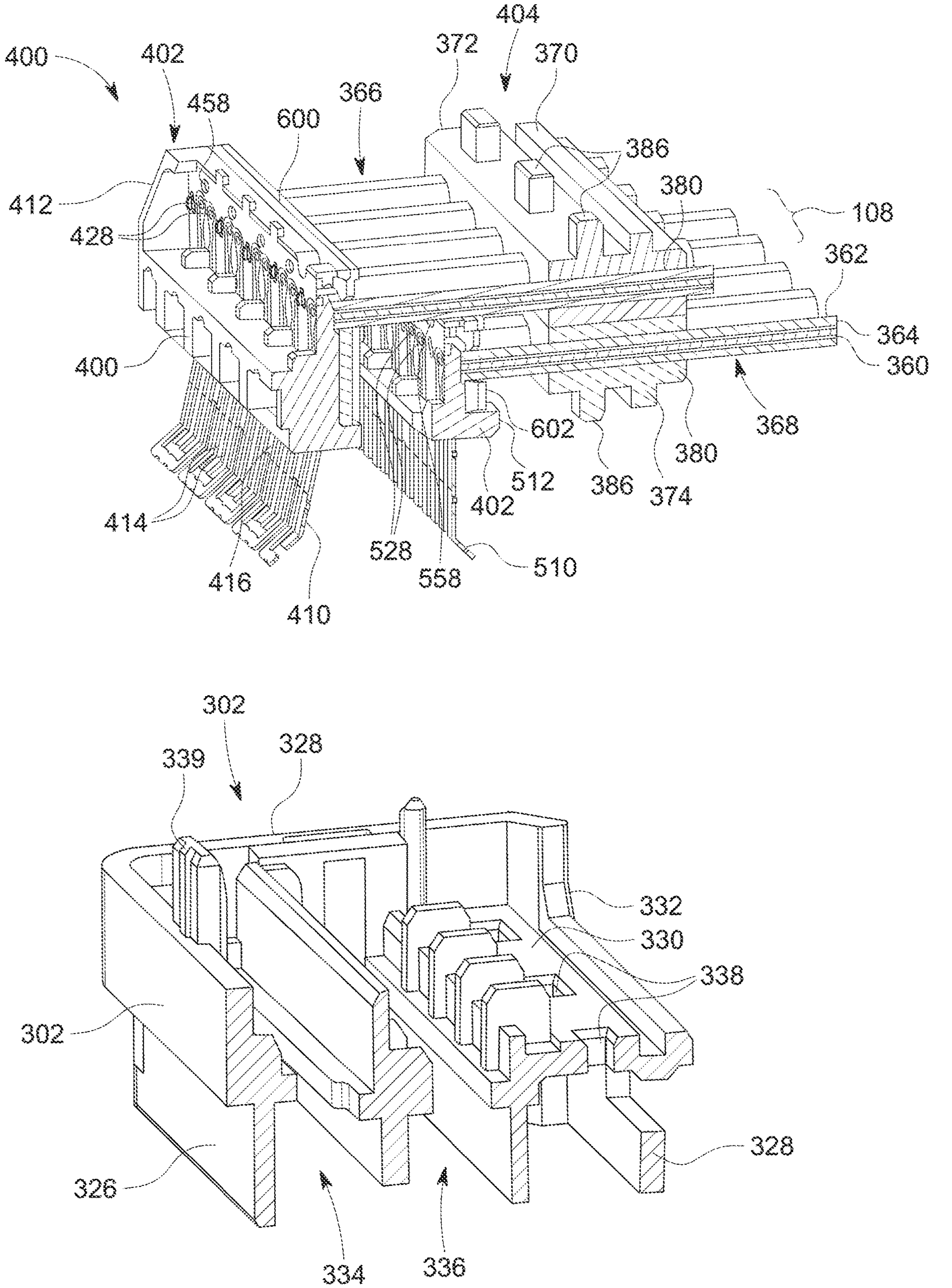
FIG. 27 is a cross-sectional assembly view of the lower housing of the receptacle connector with the terminal subassembly including the first terminal wafer and the second terminal wafer removed from the housing, the first terminal wafer being vertically taller than the second terminal wafer.

As illustrated in FIGS. 25-27, the rear sidewall 326 can include a cable opening 332 that extends downwardly from the assembly face 334 toward an intermediate platform 330 disposed within the lower housing component 302. The intermediate platform 330 is positioned between and is generally parallel to the mating face 322 and the mounding face 324 and extends between the elongated sidewalls 326 and the shorter end walls 328. The intermediate platform 330 can include structures to organize and arrange the plurality of cables 108 and the terminal subassembly 400 with respect to each other. For example, to receive and install the terminal subassembly 400, the intermediate platform 330 can have disposed therein a first wafer slot 334 and a second wafer slot 336 that provide access through the intermediate platform. The first wafer slot 334 and the second wafer slot 336 are parallel to the elongated sidewalls 326 and traverse the lateral length of the lower housing component 302 between the spaced apart end walls 328. The first wafer slot 334 can be adjacent to the forward sidewall 326 and the second wafer slot 336 can be adjacent to the rearward sidewall 326. The intermediate platform 330 can also include a plurality of recesses 338 disposed therein that are parallel and proximate to the cable opening 332 disposed in the rear sidewall 326. The cable opening 332 laterally traverses the rear sidewall 326 and permits passage of the cables 108 into the receptacle connector 104. To align and assemble to the upper housing component 304, the lower housing component 302 can have a plurality of alignment projections 339 projecting upwardly from the front sidewall 326 that can be received in corresponding recesses disposed in the upper housing component 304.

As illustrated in FIG. 23-24, the upper housing component 304 is configured for assembly with the lower housing component 302 and likewise rectangular including an assembly face 342 and a parallel, opposing ceiling 344 that are joined by parallel, elongated sidewalls 346 and parallel, shorter end walls 348 arranged orthogonally with each other. To permit passage of the plurality of cable 108, a cable opening 350 is disposed through the rear sidewall 346 that corresponds in lateral dimension to the cable opening 332 of the lower housing component 302. The ceiling 344 can extend between the orthogonally arranged sidewalls 326 and end walls 328 to cover the interior of the receptacle housing 300 when the upper and lower housing components 302, 304 are assembled together. Formed into the exterior of the ceiling 344 can be a recess 352 that is generally rectangular in shape and circumscribed by the orthogonal outline of the sidewalls 326 and end walls 328. Slots 354 are disposed through the ceiling 344 and into the end walls 328. The recess 352 and the slots 354 can accommodate a pressure plate 356 that may be placed adjacent the ceiling 344 during assembly of the lower housing component 302 and the upper housing component 304. The pressure plate 356 corresponds in dimension to fit within the recess 352 of the ceiling 344 and can distribute forces applied to the ceiling 344 during assembly of the receptacle connector 104. To retain the pressure plate 356 to the upper housing component 304, the pressure plate 356 can include spaced apart locking arms 358 that are perpendicular to and descend from the planar body of the plate and that are dimensioned to be received in the slots 354 disposed in the ceiling 344.

As illustrated in FIGS. 25-28, the plurality of cables 108 can include signal conductors for transmitting electrical signals and ground conductors for providing a return to electrical ground and which may be configured to reduce electromagnetic interference and isolate the signal conductors from other cables within the plurality. In a particular embodiment, the cables may be twinax cables in which two signal conductors 360 made of electrically conductive material such as copper wiring extend the length of the cable 108 and are surrounded by an insulator 362. The two signal conductors 360 can be configured to cooperatively transmit differential signals. The ground conductor 364 can also extend the length of the cable 108 and is made of an electrically conductive material such as metal foil. The plurality of cables 108 can be arranged in an upper first cable plurality 366 and a lower second cable plurality 368 running under the first cable plurality. In other embodiment, the cables 108 may have different configurations or may be substituted by other conductors such as ribbon cables.

To arrange and direct the plurality of cables 108 into the receptacle connector 104, the receptacle housing 300 can be associated with a cable alignment assembly 370. The cable alignment assembly can include an upper first cable alignment member 372 and a lower second cable alignment member 374 that can be elongated structures of a non-conductive material such as molded thermoplastic. The first cable alignment member 372 and the second cable alignment member 374 are generally rectangular and are coextensive with each other in lateral dimension to extend between a first member end 376 and a second member end 378. Disposed through the first and second cable alignment members 372, 374 are a plurality of cable bores 380 that are dimensioned so that individual cables of the cable plurality 108 can pass there through. The upper first cable alignment member 372 can accommodate the first cable plurality 366 and the lower second cable alignment member 374 can accommodate the second cable plurality 368. To join and form the cable alignment assembly 370, the first cable alignment member 372 the second cable alignment member 374 can includes cooperating projections 382 and recesses 384 disposed at the ends of the cable alignment members 372, 376. The cable alignment assembly 370 can align and maintain the first and second cable pluralities 366, 368 in lateral rows that run perpendicularly to the receptacle connector 104. When installed in the receptacle housing 300, the cable alignment assembly 370 can be situated in the opening formed by the cable openings 332, 350 of the respective lower housing component 300 and upper housing component 304. To retain the cable alignment assembly 370 in the cable openings 332, 350, the first and second cable alignment members 372, 374 can include a plurality of alignment projections 386 laterally spaced across their lower and upper surfaces that can be received in the recesses 338 disposed in the intermediate platform 330 of the lower housing component 320 and similar recesses that may be disposed into the upper housing component 322.

As illustrated in FIGS. 25-28, the terminal subassembly 400 can include a first terminal wafer 402 and a second terminal wafer 404. The first terminal wafer 402 can be configured for insertion into the first wafer slot 334 adjacent the forward sidewall 326 of the lower housing component 302 and the second terminal wafer 404 can be configured for insertion into the second wafer slot 336 adjacent the rear sidewall 326. The first and second terminal wafers 402, 404 can have a wafer length dimensioned to traverse the respective wafer slots 334, 336 between the spaced apart end walls 328 of the lower housing component 302. In the illustrated embodiment, to enable the first cable plurality 366 to extend over the second cable plurality 368, the first terminal wafer 402 has a first wafer height 406 that is vertically taller or larger than a second wafer height 408 associated with the second terminal wafer 404.

As illustrated in FIGS. 29-32, the taller first terminal wafer 402 includes a conductive terminal array 410 partially disposed in and support by a terminal support molding 412 made of a non-conductive material such as molded thermoplastic. In the illustrated embodiment, the terminal array 410 can include a plurality of signal terminals 414 for conducting data signals and a plurality of ground terminals 416 disposed in an alternating arrangement adjacent to each other and aligned side-by-side in a common array plane 418. In an embodiment, two signal terminals 414 can be electromagnetically coupled together as a differential signal pair and a ground terminals 416 can be positioned to either side of the differential pair to isolate them; however, in other embodiments different configurations of signal and ground terminals are contemplated. The signal terminals 414 and the ground terminals 416 of the terminal array 410 can be produced by stamping and forming a planar blank of conductive sheet metal.

Figure 33:
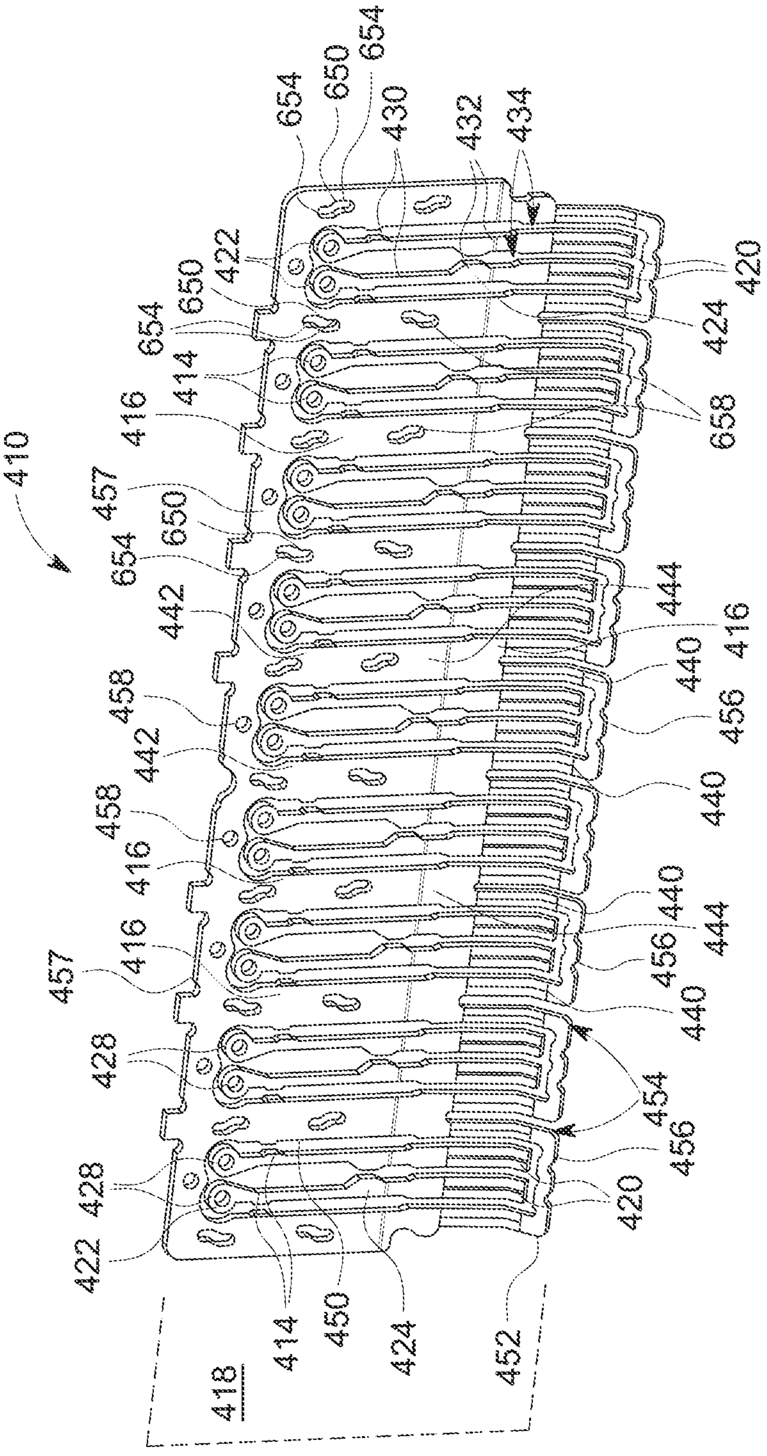
FIG. 33 is a perspective view of the terminal array for the first terminal wafer including a plurality of signal and ground terminals.
Figure 34:
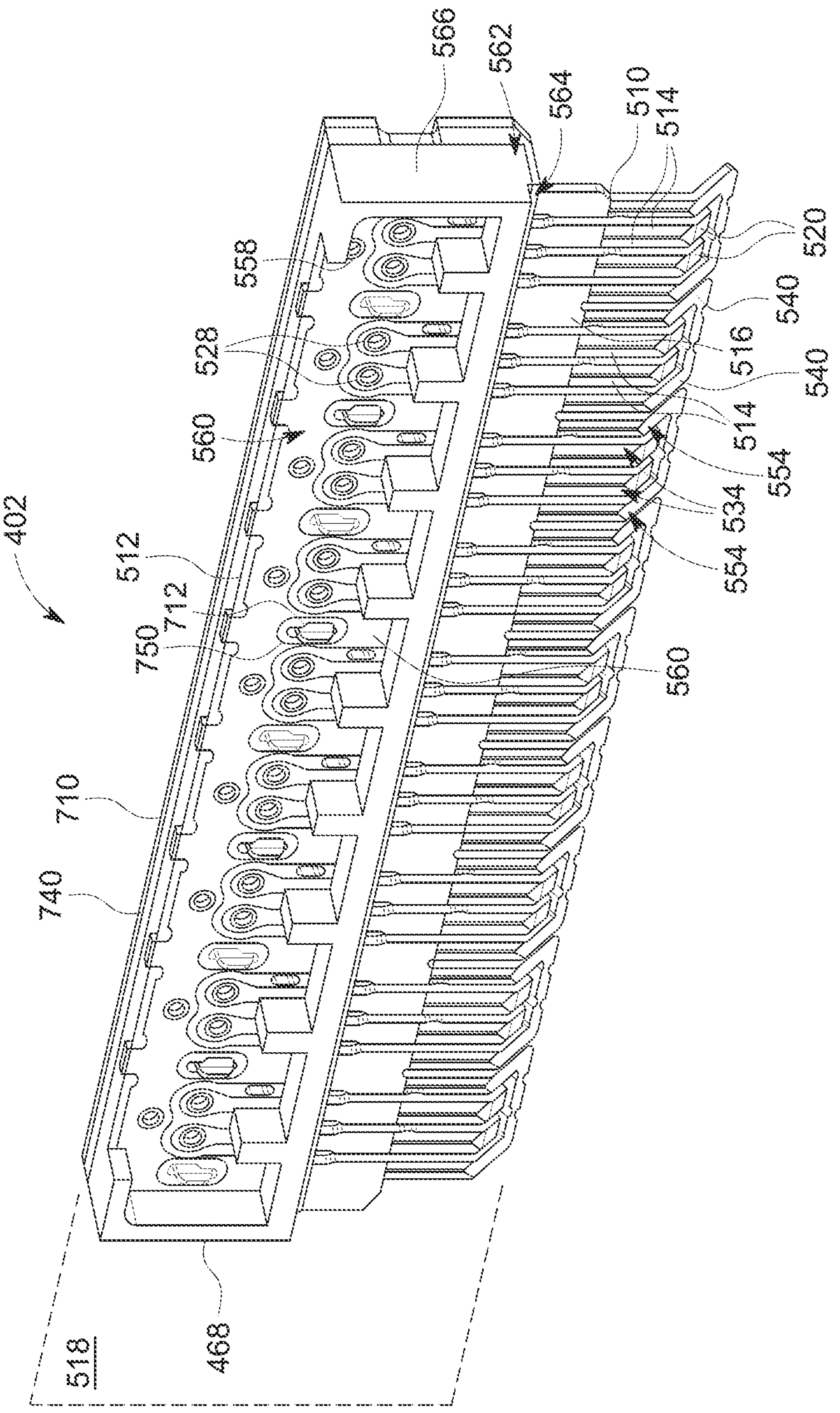
FIG. 34 is a perspective view from the front of the second terminal wafer of the receptacle connector including a terminal array with a plurality of signal and ground terminals embedded in a terminal support molding.
Figure 35:
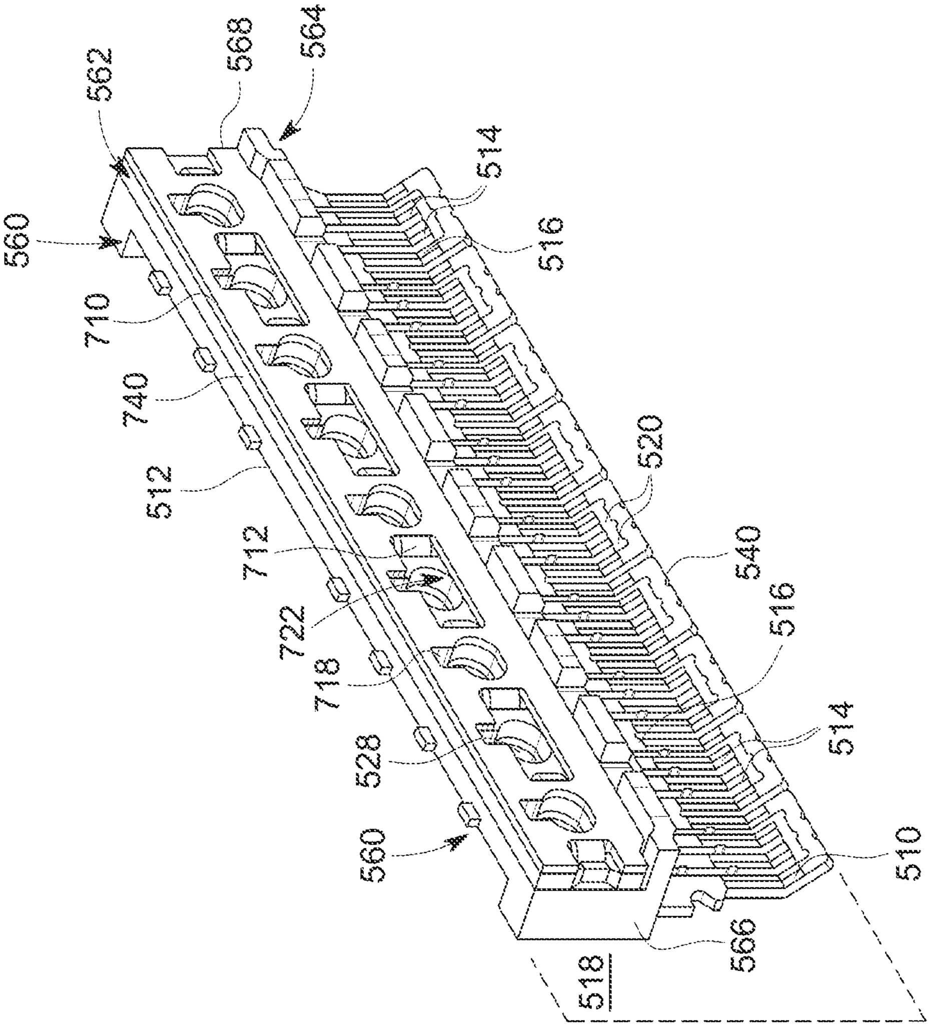
FIG. 35 is a perspective view from the rear of the second terminal wafer of the receptacle connector including the terminal array with a plurality of signal and ground terminals embedded in a terminal support molding.

As illustrated in FIG. 33, each signal terminal 414 can include a mating end 420, a termination end 422 opposite the mating end 420, and a planar mid-body portion 424 extending between and interconnecting the termination end and mating end. The mating end 420 is intended to slide against and make conductive contact with a corresponding signal terminal from the plug connector and therefore can be formed as angled end portion to guide and prevent stubbing with the corresponding terminal. The angled end portion at the mating end 420 can be offset at an angle of approximately 30° degrees with respect to the planar mid-body portion 424. The termination end 422 and the planar mid-body portion 424 can be aligned in the common array plane 418. Disposed into the termination end 422 perpendicular to the common array plane 418 can be a conductor termination hole 428.

The planar mid-body portion 424, which is elongated and generally planar, includes a first retention segment 430 extending adjacently from the termination end 422 and a second cantilevered segment 432 extending adjacently to the mating end 420. The retention segment 430 can be embedded within the terminal support molding 412 to fixedly retain the signal terminal 414 within the first terminal wafer 402. The cantilevered segment 432 includes a mating surface 434 on its rear side to make sliding contact with a corresponding signal terminal of the plug connector. The cantilevered segment 432 can exhibit spring-like deflection with respect to the common array plane 418 to urge against and maintain conductive contact with a mating signal terminal.

The ground terminals 416 can include a mating end 440, a termination end 442 opposite the mating end 440, and a planar mid-body portion 444 extending between and interconnecting the mating end 440 and the termination end 442. The mating end 440 is intended to slide against and make conductive contact with a corresponding ground terminal from the plug connector and therefore can be formed has an angled end portion to guide and prevent stubbing with the corresponding terminal. The angled end portion of the mating end 440 can be offset at an angle of approximately 30° degrees with respect to the planar mid-body portion 444. The planar mid-body portion 444, which is elongated and generally planar, is wider than the corresponding planar mid-body portion 424 of the signal terminals 414. The planar mid-body portion 444 includes a first retention segment 450 adjacent to and extending from the termination end 442 and a second cantilevered segment 452 adjacent to and extending from the mating end 440. The retention segment 450 can be embedded within the terminal support molding 412 to fixedly retain the ground terminal 416 within the first terminal wafer 402. The cantilevered segment 452 can include a mating surface 454 on its rear side to make sliding contact with a corresponding ground terminal of the plug connector. The cantilevered segment 452 can exhibit spring-like deflection with respect to the common array plane 418 to urge against and maintain conductive contact with a mating ground terminal.

In the illustrated embodiment, the mating ends 440 of the ground terminals 416 within the middle of the terminal array 410 are bifurcated at their distal ends and are joined to a conductive grounding bridge 456. However, the ground terminals 416 at either end of the terminal array 410 are not bifurcated and join to only a single conductive grounding bridge 456 directed toward the mid portion of the terminal array 410. Each conductive grounding bridge 456 extends below and across the mating ends 420 of two adjacent, differentially paired signal terminals 414 to interconnect two ground terminals 416. The conductive grounding bridges 456 are formed as an extension of the mating ends 440 and can be angled with respect to the common array plane 418 to facilitate sliding contact with a corresponding ground terminal of the plug connector. The conductive grounding bridges 456 function to electrically isolate each pair of differentially coupled signal terminals 414.

The termination ends 442 of the ground terminals 416 can be interconnected by a conductive grounding rail 457 extending across the terminal array 410 such that all ground terminals 416 are electrically interconnected. The conductive grounding rail 457 can extend over and across the termination ends 442 of the differentially coupled pair of signal terminals 414. The ground terminals 416 as interconnected by the conductive grounding bridge 456 and the conductive grounding rail 457 extend around and electrically isolate respective pairs of differentially coupled signal terminals 414. Disposed into the conductive grounding rail 457 perpendicular to the common array plane 418 can be a conductor termination hole 458. The conductor termination hole 458 of the ground terminals 416 is positioned above and between the conductor termination holes 428 of the respective differentially coupled pair of signal terminals 414. The conductor termination holes 428 of the differentially paired signal terminal 414 and the conductor termination hole 458 of the associated ground terminal 416 delineate a triangular outline.

As illustrated in FIGS. 29-32, the terminal support molding 412 can extend about and support the terminal array 410 and is coextensive with the length of the first terminal wafer 402. The terminal support molding 412 includes a forward surface 460 and an opposing rear surface 462. The signal terminals 414 and the ground terminals 416 can be disposed between the forward surface 460 an the rear surface 462 of the terminal support molding 412 with the retention segment of the signal and ground terminals 414, 416 embedded in the material of the terminal support molding 412. The terminal support molding 412 can also include a lower surface 464 from which extends the mating ends 420 of the signal terminals 414 and the mating ends 440 of the ground terminals 416. The mating surface 434 of the signal terminals 414 and the mating surface 454 of the ground terminal 416 are thus exposed below the lower surface 464 of the terminal support molding 412. The terminal support molding 412 can include opposing wafer ends 466, 468 that delineate the wafer length of the first terminal wafer 402. The terminal support molding 412 can be made from a non-conductive material such as molded thermoplastic and can be disposed about the terminal array 410 by an insert molding or over-molding manufacturing process.

As illustrated in FIGS. 26-29, the cables 108 of the upper first cable plurality 366 can be received by and terminated in the first terminal wafer 402. In particular, the insulator 362 can be removed from the ends of the first cable plurality 366 to expose the signal conductors 360 and the ground conductors 364. The signal conductors 360 can be inserted into the conductor terminations holes 428 of the signal terminals 414 and the ground conductors 364 can be inserted into the conductor termination holes 458 of the ground terminals 416. The ends of the signal conductors 360 and the ends of the ground conductors 366 are therefore arranged in a similar triangular configuration as the conductor termination holes 428, 458. The ends of the signal conductors 360 and the ends of the ground conductors 364 can be bonded in the respective conductor termination holes 428, 454 by, for example, laser welding to establish an electrically conductive connection between the first cable plurality 366 and the terminal array 410. Because the ground terminals 416 are interconnected at their termination ends 442 by the grounding rail 457 and at the mating ends 440 by the grounding bridge 456, the ground terminals are likewise conductively interconnected and establish a common electrical ground.

As illustrated in FIGS. 33-36, the vertically shorter second terminal wafer 404 includes a conductive terminal array 510 partially disposed in and supported by a terminal support molding 512 made of non-conductive material such as molded thermoplastic. In the illustrated embodiment, the terminal array 510 can include a plurality of signals terminals 514 for conducting data signals and a plurality of ground terminals 516 disposed in an alternating arrangement adjacent to each other and aligned in a side-by-side configuration in an array plane 518. In an embodiment, two signal terminals 514 can be electromagnetically coupled together as a differential signal pair and a ground terminal 516 can be positioned to either side of the differential pair to isolate them; however, in other embodiments different configurations of signal and ground terminals are contemplated. The signal terminals 514 and the ground terminals 516 of the terminal array 510 can be produced by stamping and forming a planar blank of conductive sheet metal.

Figure 38:
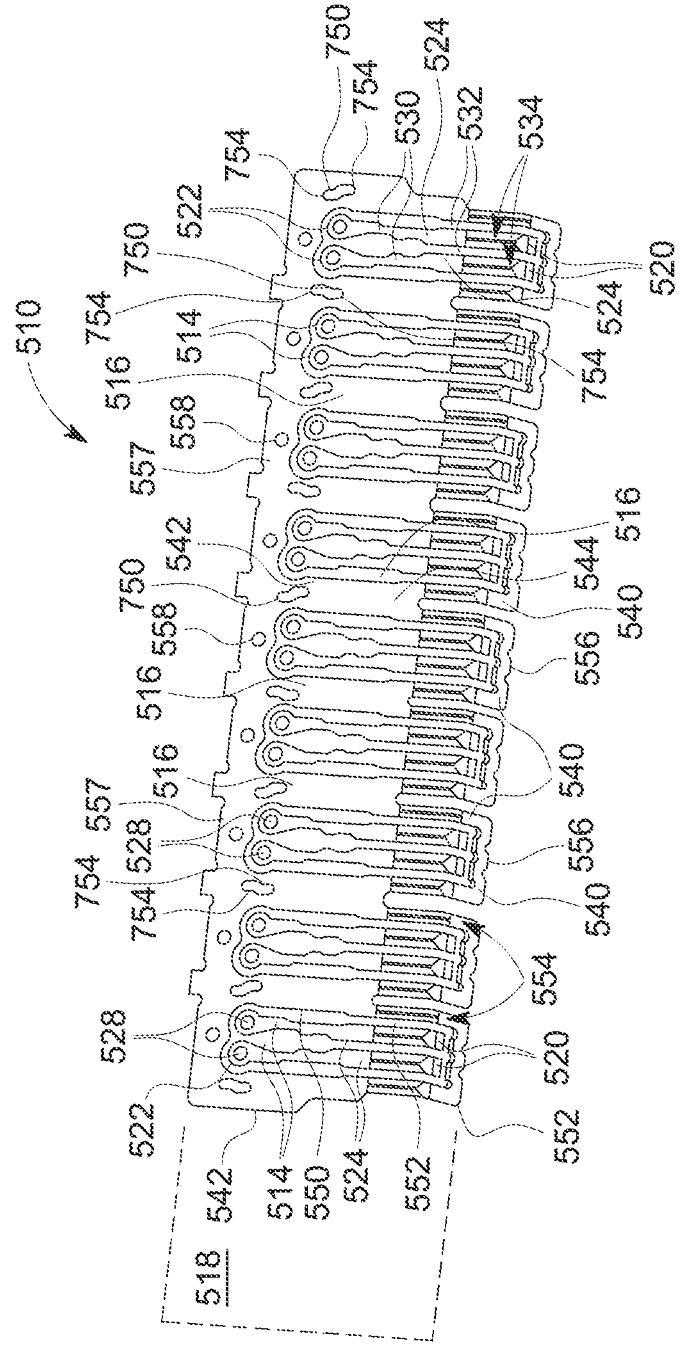
FIG. 38 a perspective view of the terminal array for the second terminal wafer including a plurality of signal and ground terminals.

As illustrated in FIG. 38, each signal terminal 514 can include a mating end 520, a termination end 522 opposite the mating end 520, and a planar mid-body portion 524 extending between and interconnecting the mating end 520 and the termination end 522. The mating end 520 is intended to slide against and make conductive contact with a corresponding signal terminal from the plug connector and therefore can be formed as an angled end portion to guide and prevent stubbing with the corresponding terminal. The angled end portion of the mating end 520 can be offset at an angle of approximately 30° degrees with respect to the planar mid-body portion 524. The termination end 522 and the planar mid-body portion 524 can be aligned in the common array plane 518. Disposed into the termination end 522 perpendicular to the common array plane 518 can be a conductor termination hole 528.

The planar mid-body portion 524, which is elongated and generally planar, includes a first retention segment 530 extending adjacently from the termination end 522 and a second cantilevered segment 532 extending adjacently to the mating end 500. The retention segment 530 can be embedded within the terminal support molding 512 to fixedly retain the signal terminal 514 within the second terminal wafer 404. The cantilevered segment 532 includes a mating surface 534 on its rear side to make sliding contact with a corresponding signal terminal of the plug connector. The cantilevered segment 532 can exhibit spring-like deflection with respect to the array plane 518 to urge against and maintain conductive contact with mating signal terminal.

The ground terminals 516 can include a mating end 540, a termination end 542 opposite the mating end 540, and a planar mid-body portion 544 extending between and interconnecting the mating end 540 and the termination end 542. The mating end 540 is intended to slide against and make conductive contact with a corresponding ground terminal from the plug connector and therefore can be formed as an angled end portion to guide and prevent stubbing with the corresponding ground terminal. The angled end portion of the mating end 540 can be offset at an angle of approximately 30° degrees with respect to the planar mid-body portion 544. The planar mid-body portion 544, which is elongated and generally planar, is wider than the corresponding planar mid-body portion 524 of the signal terminals 514. The planar mid-body portion 544 includes a first retention segment 550 adjacent to and extending from the termination end 542 and a second cantilevered segment 552 adjacent to and extending from the mating end 540. The retention segment 550 can be embedded within the terminal support molding 512 to fixedly retain the ground terminal 516 within the second terminal wafer 404. The cantilevered segment 552 can includes a planar mating surface 554 on its forward side to make sliding contact with a corresponding ground terminal of the plug connector. The cantilevered segment 552 can exhibit spring-like deflection with respect to the array plane 518 to urge against and maintain conductive contact with mating ground terminal.

In the illustrated embodiment, the mating ends 540 of the ground terminals 516 within the middle of the terminal array 510 are bifurcated at their distal ends and are joined to a conductive grounding bridge 556. However, the ground terminals 516 at either end of the terminal array 510 are not bifurcated and join to only a single conductive grounding bridge 556 directed towards the mid portion of the terminal array 516. Each conductive grounding bridge 556 extends below and across the mating ends 520 of two adjacent, differentially paired signal terminals 514 to interconnect two ground terminals 516. The conductive grounding bridges 556 are formed as an extension of the mating ends 540 and can be angled with respect to the common array plane 518 to facilitate sliding contact with a corresponding ground terminal of the plug connector. The conductive grounding bridges 556 function to electrically isolate each pair of differentially coupled signal terminals 514.

The termination ends 542 of the ground terminals 516 can be interconnected by a conductive grounding rail 557 extending across the terminal array 510 such that all ground terminals 516 are electrically interconnected. The conductive grounding rail 557 can extend over and across the termination ends 522 of the differentially coupled pairs of signal terminals 514. The ground terminals 516 as interconnected by the conductive grounding bridge 556 and the conductive grounding rail 557 extend around and electrically isolate respective pairs of differentially coupled signal terminals 514. Disposed into the conductive grounding rail 557 perpendicular to the common array plane 518 can be a conductor termination hole 558. The conductor termination hole 558 of the ground terminals 516 is positioned above and between the conductor termination holes 528 of the respective differentially coupled pair of signal terminals 514. The conductor termination holes 528 of the differentially paired signal terminals 514 and the conductor termination hole 558 of the associated ground terminal 516 delineate a triangular outline.

As illustrated in FIGS. 34-37, the terminal support molding 512 can extend about and support the terminal support array 510 and is coextensive with the wafer length of the second terminal wafer 404. The terminal support molding 512 includes a forward surface 560 and an opposing rear surface 562. The signal terminals 514 and the ground terminals 516 can be disposed between the forward surface 560 and the rear surface 562 with the signal and ground terminals 514, 516 embedded in the non-conductive material of the terminal support molding 512. The terminal support molding 512 can also include a lower surface 564 from which extends the mating ends 520 of the signal terminals 514 and the mating ends 540 of the ground terminals 516. The mating surfaces 534 of the signal terminals 514 and the mating surfaces 554 of the ground terminal 516 are thus exposed below the lower surface 564 of the terminal support molding 512. The terminal support molding 512 can include opposing wafer ends 566, 568 that are delineate the length of the second terminal wafer 404. The terminal support molding 512 can be made from a non-conductive material such as molded plastic and can be disposed about the terminal array 510 by an insert molding or over-molding manufacturing process.

As illustrated in FIGS. 26-28 and 35, the cables 108 of the lower second cable plurality 368 can be received by and terminated in the second terminal wafer 404. In particular, the insulator 362 can be removed from the ends of the second cable plurality 368 to expose the signal conductors 360 and the ground conductors 364. The signal conductors 360 can be inserted into conductor termination holes 528 of the signal terminals 514 and the ground conductors 364 can be inserted into the conductor termination holes 558 of the ground terminals 516. The ends of the signal conductors 360 and the ends of the ground conductors 362 can be bonded in the respective conductor termination holes 528, 558 by, for example laser welding to establish an electrically conductive connection between the second cable plurality 368 and the terminal array 510. Because the ground terminals 516 are interconnected at their mating ends 520 by the conductive grounding bridges 556 and at their termination ends 542 by the conductive grounding rail 557, the ground conductors 366 are likewise conductively interconnected and establish a common electrical ground.

Figure 28:
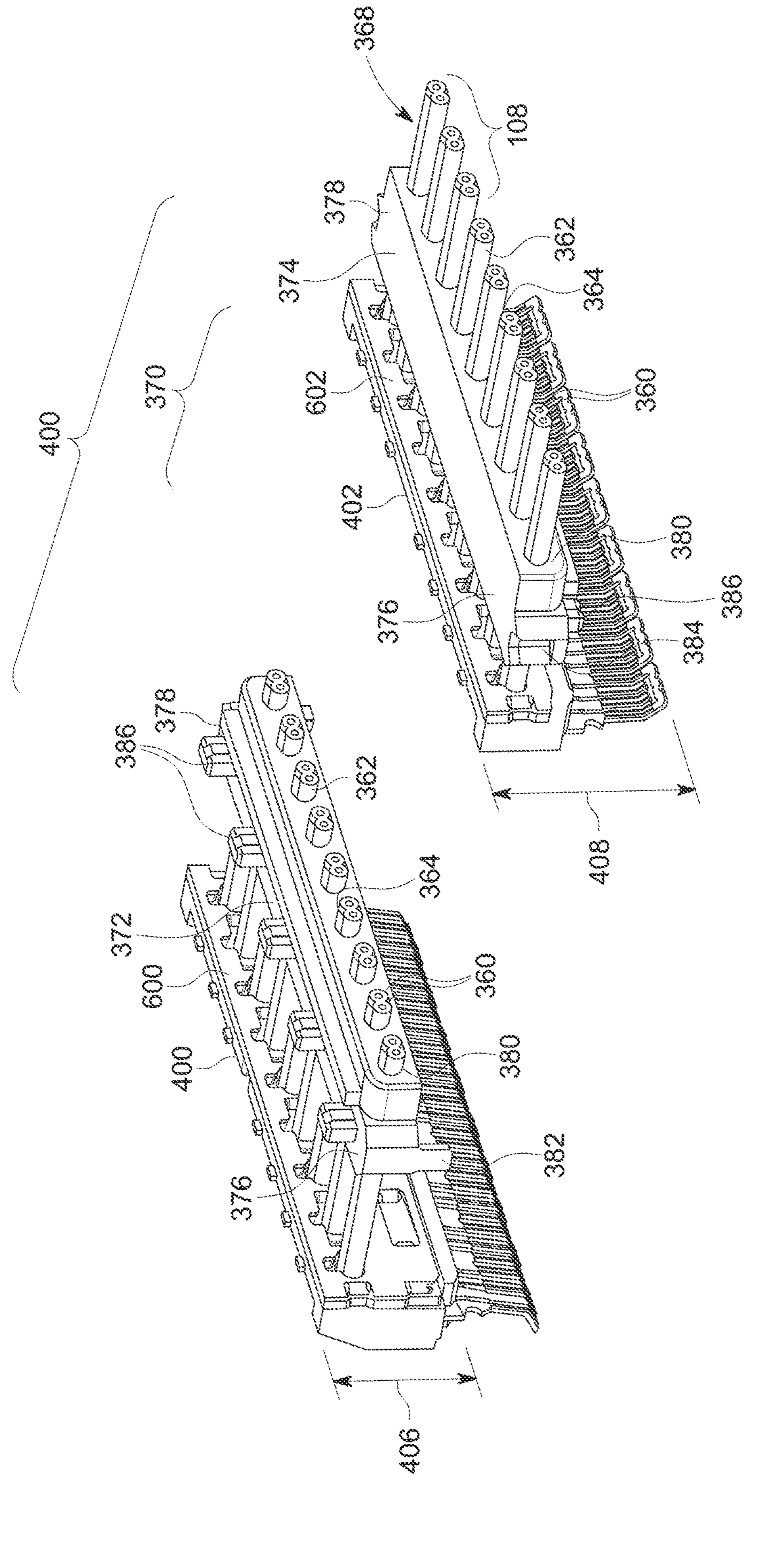
FIG. 28 is a perspective view from the rear of the first terminal wafer and the second terminal wafer including cable alignment structure of the terminal subassembly for the receptacle connector.
Figure 29:
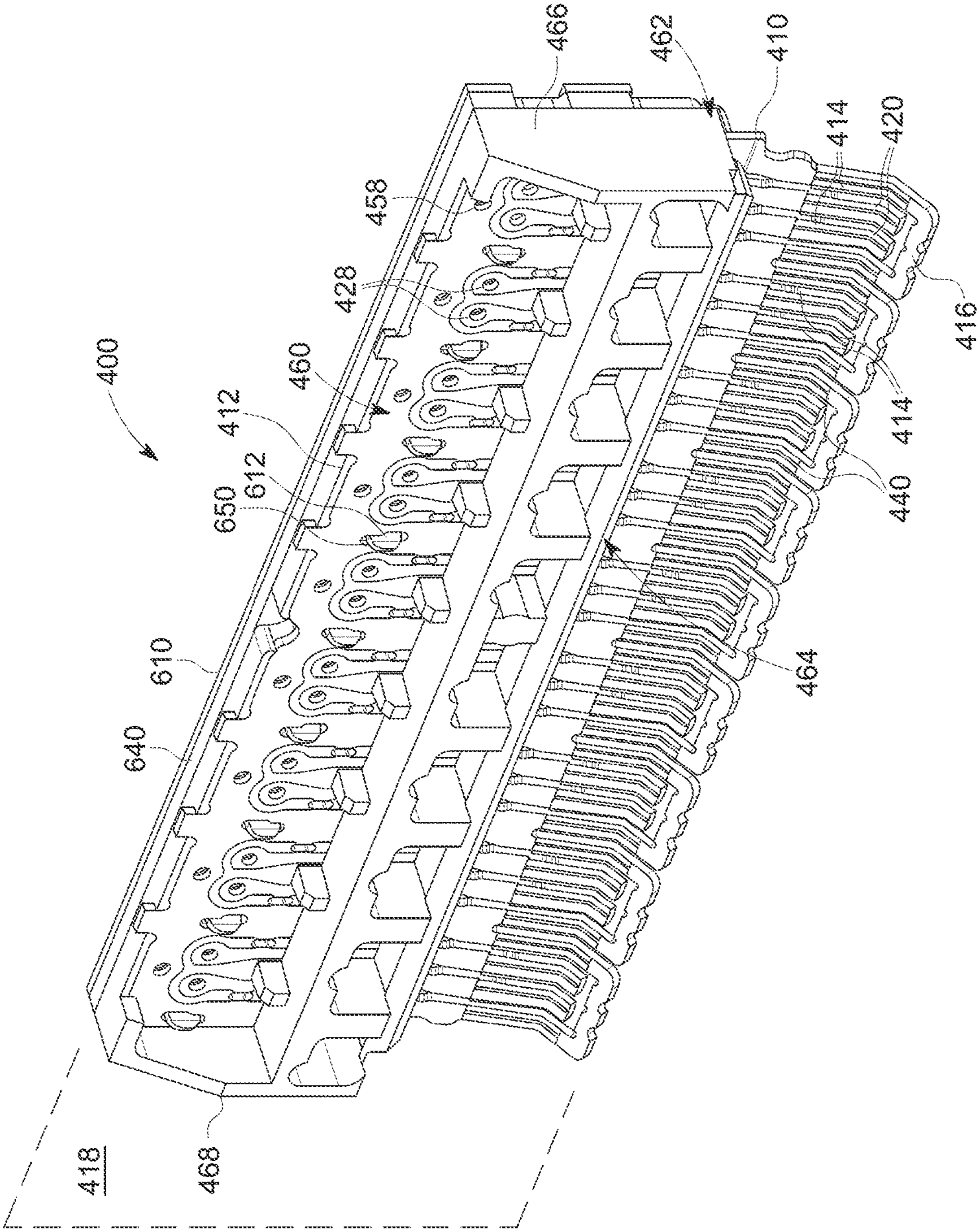
FIG. 29 is a perspective view from the front of the first terminal wafer of the receptacle connector including a terminal array with a plurality of signal and ground terminals embedded in a terminal support molding.
Figure 30:
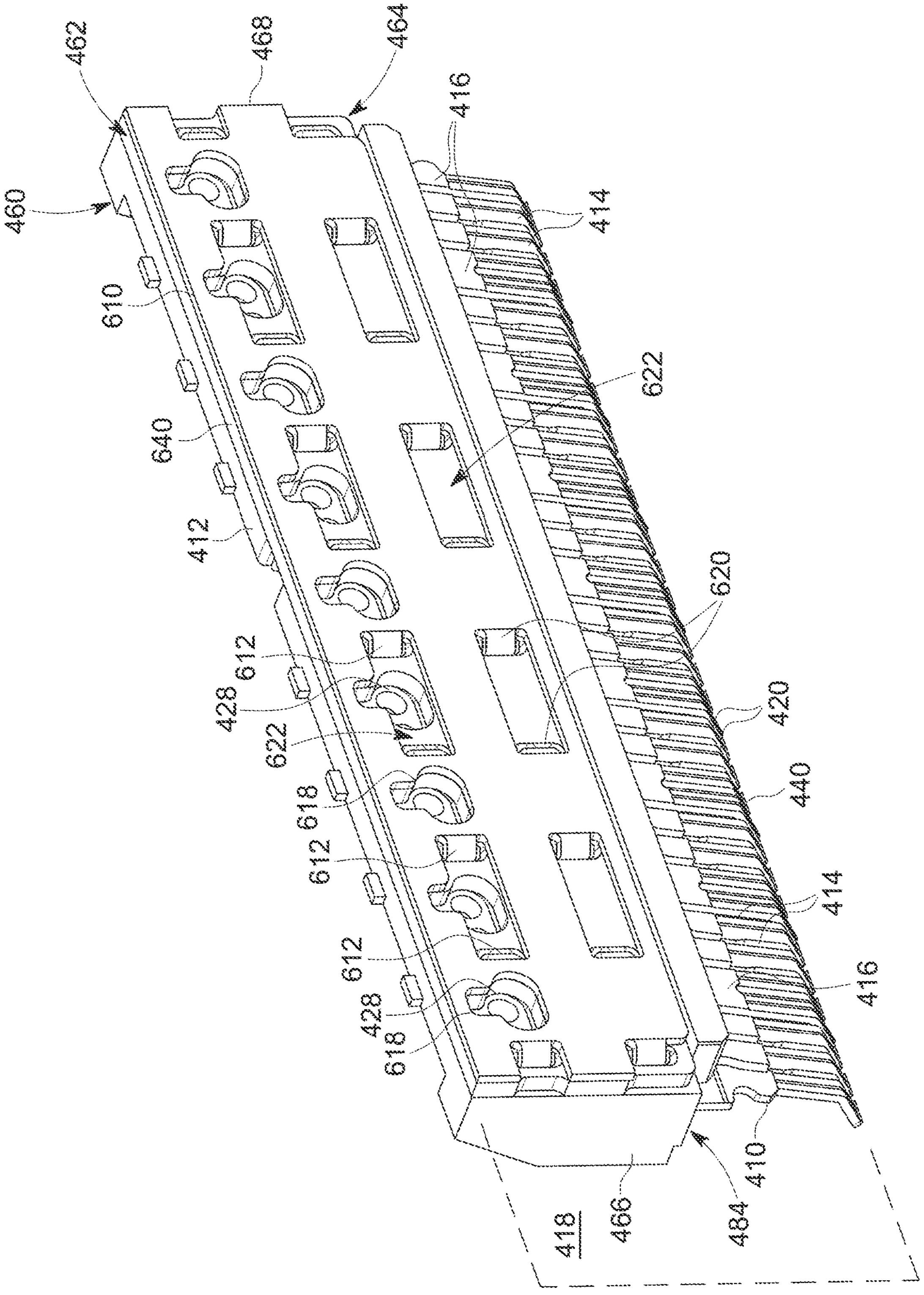
FIG. 30 is a perspective view from the rear of the first terminal wafer of the receptacle connector including the terminal array with a plurality of signal and ground terminals embedded in a terminal support molding.

In an aspect of the disclosure, as illustrated in FIGS. 26-28, the first terminal wafer 402 and the second terminal wafer 404 can each include a respective first conductive ground shielding 600 and a second conductive ground shielding 602 that provide additional electromagnetic shielding for the connector assembly. The first ground shielding and second ground shielding 600, 602 are flat, planar structures that are disposed adjacent to the respective first terminal wafer 402 and the second terminal wafer 404 and can be coextensive with the length of the terminal wafers. In particular, the first ground shielding 600 can extend between and is coextensive with the respective wafer ends 466, 468 of the first terminal support molding 412 the second ground shielding 602 can extend between and is coextensive with the respective wafer ends 566, 568 of the second terminal support molding 512. The first and second ground shieldings 600, 602 are adjacent the rear surfaces 462, 562 of the terminal support moldings 412, 512 of the respective first and second terminal wafers 402, 404 from which extend the first cable plurality 366 and second cable plurality 368.

In an embodiment, the conductive ground shieldings 600, 602 can be made from stamped and formed metal plates. In another embodiment, the conductive ground shieldings 600, 602 can be made from a metal injection molding process in which metal powder is mixed with a binder and cast into a finished part having conductive properties due to the metal powder. In another embodiment, the conductive ground shieldings 600, 602 can be formed from a metalized plastic in which a molded plastic part is coated with metal to impart conductive properties.

As illustrated in FIGS. 29-32, the planar shape of the first ground shielding 600 is parallel to the common array plane 418 of the first terminal wafer 402 when attached thereto. In an embodiment, the first ground shielding 600 can be assembled from a relatively thin, flat projection plate 610 and a relatively thicker intermediate plate 640. To interconnect with the terminal array 410, the projection plate 610 can include a plurality of grounding projections 612 that extend perpendicularly from the plane of the projection plate 610 and perpendicularly with respect to the common array plane 418. The grounding projections 612 are laterally spaced along the lateral length of the first ground shielding 600 and can correspond in number and alignment with the plurality of ground terminals 416 in the terminal array 410. In an embodiment, the grounding projections 612 can be grounding tabs that are aligned in a vertical orientation and thus have a vertical tab height 614. In an embodiment, the projection plate 610 can be made from sheet metal and the grounding tabs that form the ground projections 612 can be tabs or flaps punched from and integral to the projection plate 610. Punching of the grounding projections 612 from the projection plate 610 results in rectangular tab openings 616 being formed into the projection plate 610 between adjacent grounding projections 612. In other embodiments, the ground projections 612 can have other suitable shapes and configurations.

To allow cables from the first cable plurality to pass through the first ground shielding 600, a plurality of cable openings 618 are disposed through the projection plate 610. The cable openings 618 can be generally triangular or pear-shaped to match the triangular outline of the conductor termination holes 428, 458 disposed into the signal terminal 414 and the ground terminals 416 of the terminal array 410. The cable openings 618 therefore accommodate the triangular arrangement of the signal and ground conducts of the twinax cables. The cable openings 618 can be positioned between laterally adjacent grounding projections 612 extending from the projection plate 610.

In an embodiment, because the first terminal wafer 402 has a first wafer height that is taller than the second wafer height, the projection plate 610 can include a second plurality of grounding projections 620 extending from the plane of the projection plate 610 perpendicularly to the common array plane 418 of the terminal array 410. The second plurality of grounding projections 620 also correspond in number and alignment with the ground terminals 416 of the terminal array; however the second plurality of grounding projections 620 can be located vertically below the respective first plurality of grounding projections 612. The second plurality of grounding projections 620 can be formed as punched tabs similar to the first plurality of grounding projections 612 and can also result in a rectangular hole 622 being formed into the projection plate 610. The second plurality of grounding projections 620 can also be aligned in the vertical direction and can have a vertical tab height 624 similar to the vertical tab height 614 of the first grounding projections 612. In other embodiments, the first and second grounding projections 612, 620 can be joined as single, vertically elongated tabs punched from the projection plate 610.

The thicker intermediate plate 640 can be made from conductive material such as a stamped metal plate or may be sintered or cast metal. The intermediate plate 640 is also coextensive with the length of the first terminal wafer 402 and extends between the first and second wafer ends 466, 468 of the terminal support molding 412. The intermediate plate 640 can have a thickness 642 that provides the relative bulk of the intermediate plate with respect to the thinner projection plate 610. To allow passage of the cables of the first cable plurality, the intermediate plate 640 includes a plurality of cable openings 644 that are aligned with and similar in shape to the plurality of cable openings 618 disposed in the projection plate 610. To allow the grounding projections 612 from the projection plate 610 to extend to and connect with the ground terminals 416 of the terminal array 410, the intermediate plate 640 can include a first plurality of slots 646 that are arranged in a lateral row across the intermediate plate. The plurality of slots 646 extend through the body of the intermediate plate 640 and are oriented perpendicularly toward the common array plane 418 of the terminal array 410. The slots 646 can correspond in number and alignment with the plurality of grounding projections 612. In the embodiment where the grounding projections 612 are formed as vertical tabs with an associated vertical tab height 614, the slots 646 can have similar dimensions to allow for passage of the tabs through the intermediate plate 640. In the embodiment in which a second plurality of grounding projections 620 can be formed vertically below the first plurality of the grounding projections 612 in the projection plate 610, the intermediate plate 460 can have a corresponding second plurality of slots 648 disposed therein and in alignment with the second plurality of grounding projections.

Figure 32:
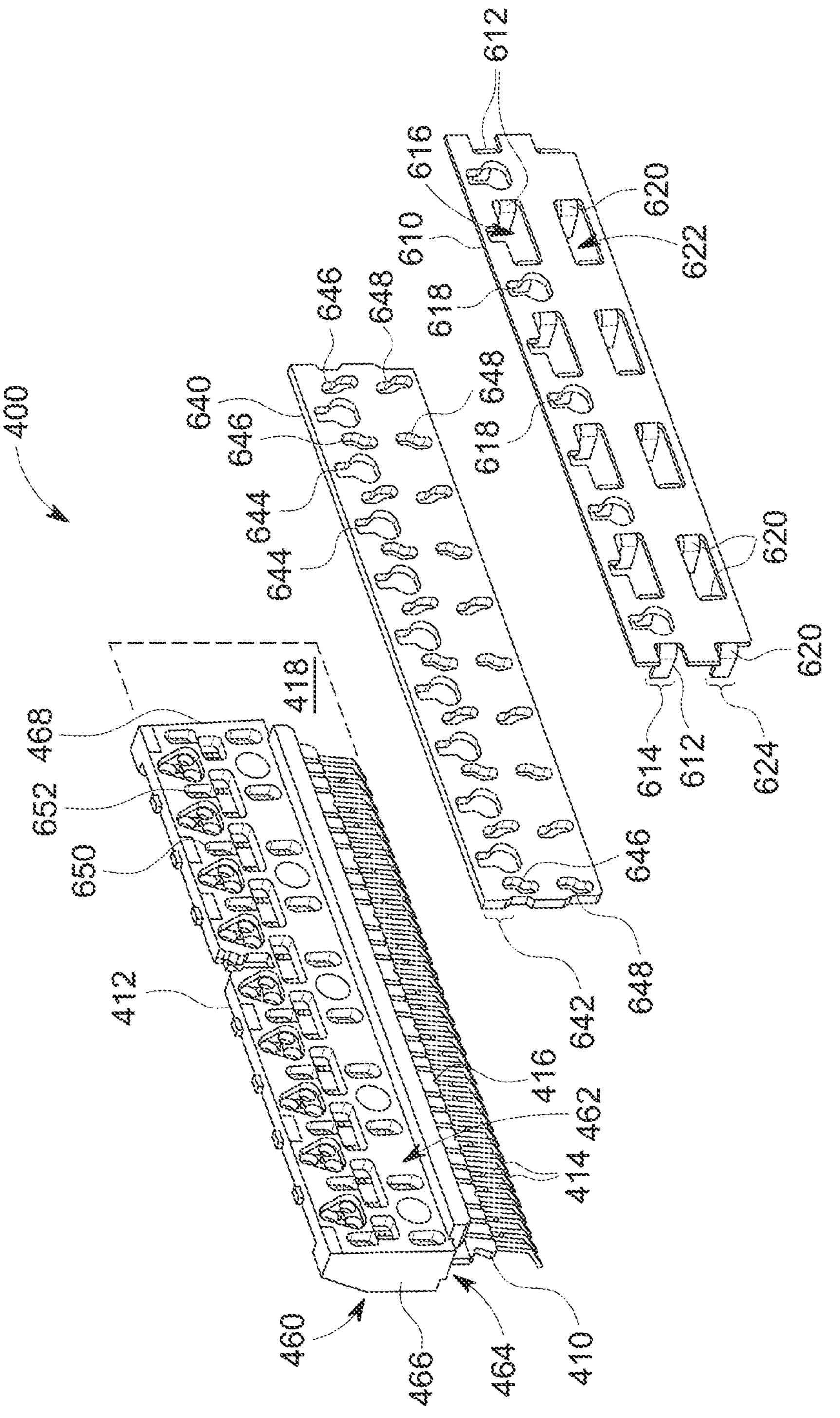
FIG. 32 is a perspective assembly view from the rear of the first terminal wafer including the conductive ground shielding adjacent thereto.

To mechanically and electrically connect with the grounding projections 612 from the first ground shielding 600, a plurality of grounding apertures 650 can be disposed in the terminal array 410 of the first terminal wafer 402. For example, as illustrated in FIG. 32, the grounding apertures 650 can be disposed in the termination end 442 of each ground terminal 416 of the terminal array 410 immediately below the grounding rail 457 that extends across the terminal array. The number and alignment of the grounding apertures 650 can correspond to the number and alignment of the first plurality of grounding projections 612. Because the termination ends 442 of the grounding terminals 416 are embedded in the terminal support molding 412, material may be removed from the terminal support molding proximate the termination ends to provide projections openings 652 that expose the grounding slots 650 to the grounding projections 612.

As illustrated in FIG. 33, in an embodiment, the grounding apertures 650 may be non-complementary in shape or alignment with the grounding projections 612 to twist or distort them. For example, the grounding apertures 650 may be shaped as slots similar in dimension to tabs that form the grounding projections 612 but which have first and second offset legs 654 that are laterally offset with respect to the vertical alignment of the grounding projections. The first and second offset legs 654 can be disposed toward the lateral ends of the terminal wafer so that the grounding aperture 650 does not conform in vertical alignment with the grounding projections 612 extending from the projection plate 610. In addition, the laterally direction of the offsets in the offset legs 654 may alternate from ground terminal 416 to ground terminal 416 to provide an alternating arrangement of offset slots disposed laterally across the terminal array. In other embodiments, the non-complementary alignment between the blades and apertures can be provided by other arrangements such as offset legs as described below or by non-complementary shapes or outlines of the blades and apertures such as circles, squares, and/or diamonds or by disposing the apertures in a non-perpendicular direction through the ground terminals. In the embodiment where the grounding plate 610 includes a second plurality of lower grounding projections 620 extending therefrom, a second plurality of grounding apertures 658 can be disposed in the ground terminals 416 generally perpendicular to the planar mid-body portion 442 to correspond in alignment with the second plurality of grounding projections.

Figure 31:
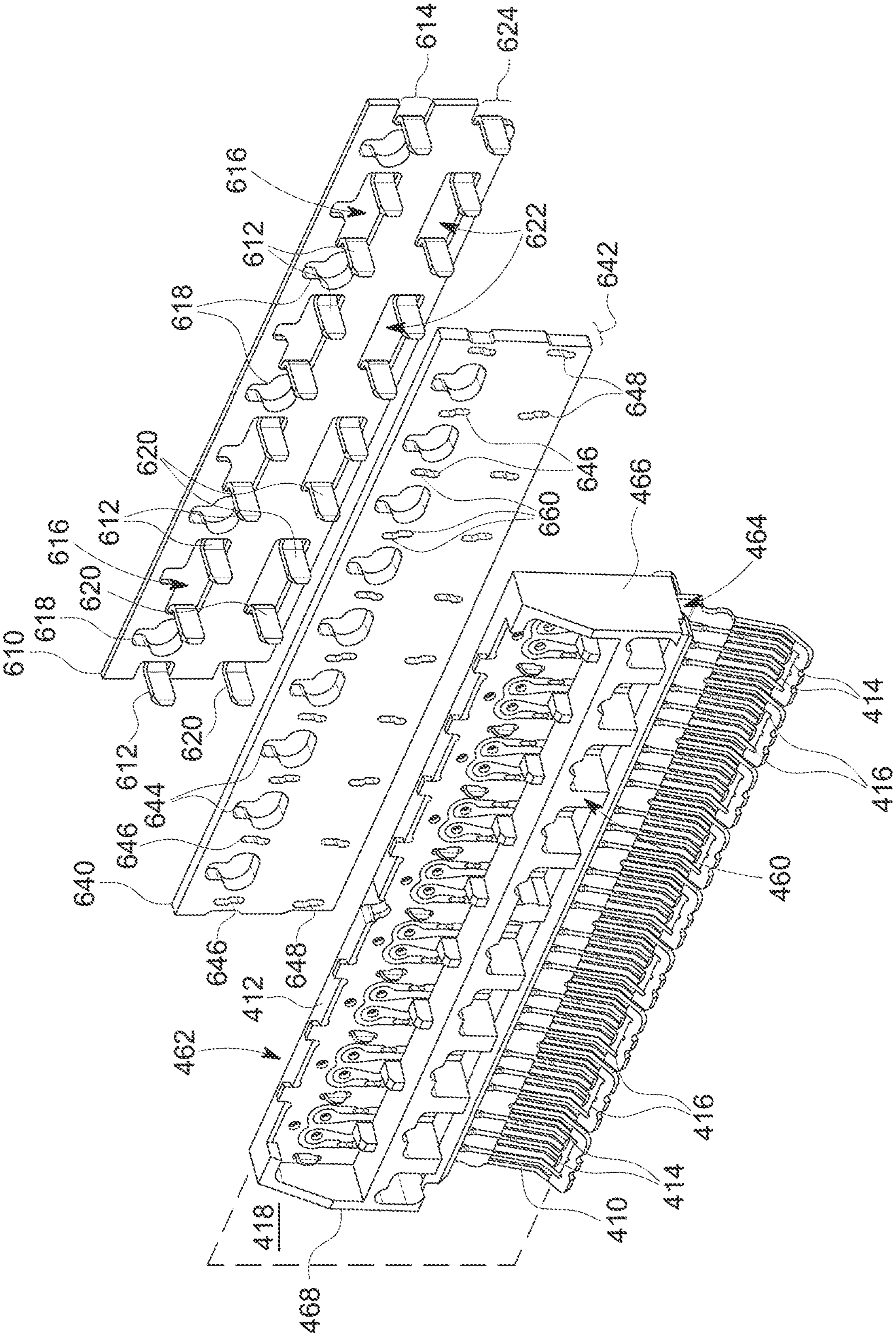
FIG. 31 is a perspective assembly view from the front of the first terminal wafer including a conductive ground shielding adjacent thereto.

As illustrated in FIGS. 31-32, to mechanically and electrically interconnect the first ground shielding 600 and the terminal array 410, the projection plate 610 is positioned with respect to the rest of the first terminal wafer 402 so that the grounding projections are aligned with the plurality of grounding apertures in the ground terminals 416. The intermediate plate 640 may be disposed between the terminal support molding 412 and the projection plate 610 so that the slots 646 in the intermediate plate 640 and corresponding mold openings 652 in the terminal support molding align allowing passage of the grounding projections 612 from the plane of the projection plate 610 to the common array plane 418 of terminal array 410. Upon insertion of the grounding projections 612 into the grounding apertures 650 of the ground terminals 416, the offset legs 654 will cause the tab-like grounding projections to rotate or twist with respect to the vertical extension of the grounding projection and the ground terminal. The second plurality of lower grounding projections 620 can be similarly received into and distorted by the second plurality of grounding apertures 658 disposed into the ground terminals 416. The material and thickness of the projection plate 610 can be selected to facilitate distortion of the grounding projections 612. The torsional force caused by rotation of the grounding projection 612 in the respective grounding apertures 650 provides good mechanical and electrical contact between the first ground shielding 600 and each of the ground terminals 416 in that ground shielding and ground terminals are unlikely to disengage and while maintaining good conductivity. A possible advantage of establishing electrical conduction between the plurality of ground terminals 416 through the conductive ground shielding 600 is that the electrical path between the mating ends and mounting ends of the ground terminals are shortened, which can advantageously affect resonance frequencies in the around circuit.

In an embodiment, the slots 646 disposed in the intermediate plate 640 can also have offset legs 660 laterally offset with respect to the vertical extension of the tab-like grounding projections 612 to distort the grounding projections upon insertion through the intermediate plate. Distortion of the grounding projections 612 within the slots 646 ensures the protrusion plate 610 and intermediate plate 640 are mechanically and electrically coupled together. Referring to FIG. 27, because shielding may be removed from the first cable plurality 366 where the signal conductors 360 terminate in the conductor termination holes 428 of the terminal array 410, the thickness of the first ground shielding 600 may assist in impendence at the termination point. In addition, referring to FIG. 31, it will be appreciated that because the grounding projections 612 are disposed on either side of the cable openings 618 in the projection plate 610 and the cable openings 644 of the intermediate plate 640, the tab-like grounding projections will extend to either side of and parallel with the cables as they connect with the first terminal wafer 402. The grounding projections 612 therefore further isolate and improve coupling between the signal conductors within the first terminal wafer.

As illustrated in FIGS. 34-37, the second ground shielding 602 is similar in construction and arrangement to the first ground shielding. The second ground shielding 602 is parallel to the common array plane 518 when attached to the second terminal wafer 404. The second ground shielding 602 can also be assembled from a relatively thin, planar projection plate 710 and a relatively thicker intermediate plate 740. Projecting from the plane of the projection plate 710 perpendicular to the common array plane 518 are a plurality of grounding projections 712. The grounding projections 712 can be laterally spaced along the lateral length of the second ground shielding 602 and can correspond in number and alignment with the ground terminals 516 of the second terminal array 510. The grounding projections 712 can be formed as grounding tabs that are punched from and integral with the projection plate 710, which may be made from sheet metal. The grounding tabs may be vertically aligned and may have a vertical tab height 714 that is same as the height and dimension of the grounding tabs of the first ground shielding. Punching of the grounding projections 712 results in rectangular tabs openings 716 being formed in the projection plate 710. To permit the cables of the second cable plurality to pass through the first ground shielding 602, a plurality of cable openings 718 are also punched into the protrusion plate that are similar in dimension and configuration to the cable openings of first ground shielding. The cable openings 718 may be triangular or pear-shaped to accommodate the twinax cable configuration. Because the second terminal wafer 404 is vertically shorter than the first terminal wafer 402, only a single row of grounding projections 712 is formed on the projections plate 710.

The thicker intermediate plate 740 can also be made from conductive material such as cast or sintered metal. The intermediate plate 740 has a thickness 742 that provides bulk or heft to the intermediate plate relative to the thinner projection plate 710. To allow passage of the cables from the second cable plurality, the intermediate plate 740 include a plurality of cable openings 744 that are aligned with and similar in shape to the cable openings 718 in the projection plate 710. Likewise, to allow the grounding projections 712 from the projection plate 710 to extend to and contact the ground terminals 516 of the second terminal array 518, a plurality of slots 746 are disposed through the intermediate plate in a perpendicular direction toward the common array plane 518. The slots 746 are arranged in a lateral row across the intermediate plate 740 and correspond in number and alignment with the grounding projections 712. In the embodiment where the grounding projections 712 are formed as punched tabs, the slots 746 can correspond in dimension to accommodate passage of the tabs.

To mechanically and electrically interconnect with the grounding projections 712 from the second ground shielding 602, a plurality of grounding apertures 750 can be disposed in the terminal array 510 of the second terminal wafer 404. For example, as illustrated in FIG. 38, the grounding apertures 750 can be formed in the termination ends 542 of each ground terminals 516 of the terminal array 510 immediately below the grounding rail 557 extending across the terminal array. The number and alignment of the grounding apertures 750 can correspond to the number and alignment of the plurality of grounding projections 712. In particular, since only a signal lateral row of grounding projections 712 extend from the projection plate 710, only a single corresponding lateral row of grounding apertures 750 are included in the terminal array 510. Because the termination ends 542 of the grounding terminals 516 are embedded in the terminal support molding 512, mold openings 752 can be provided by removing material from the terminal support molding to expose the grounding apertures 750 to the grounding projections 612.

Figure 36:
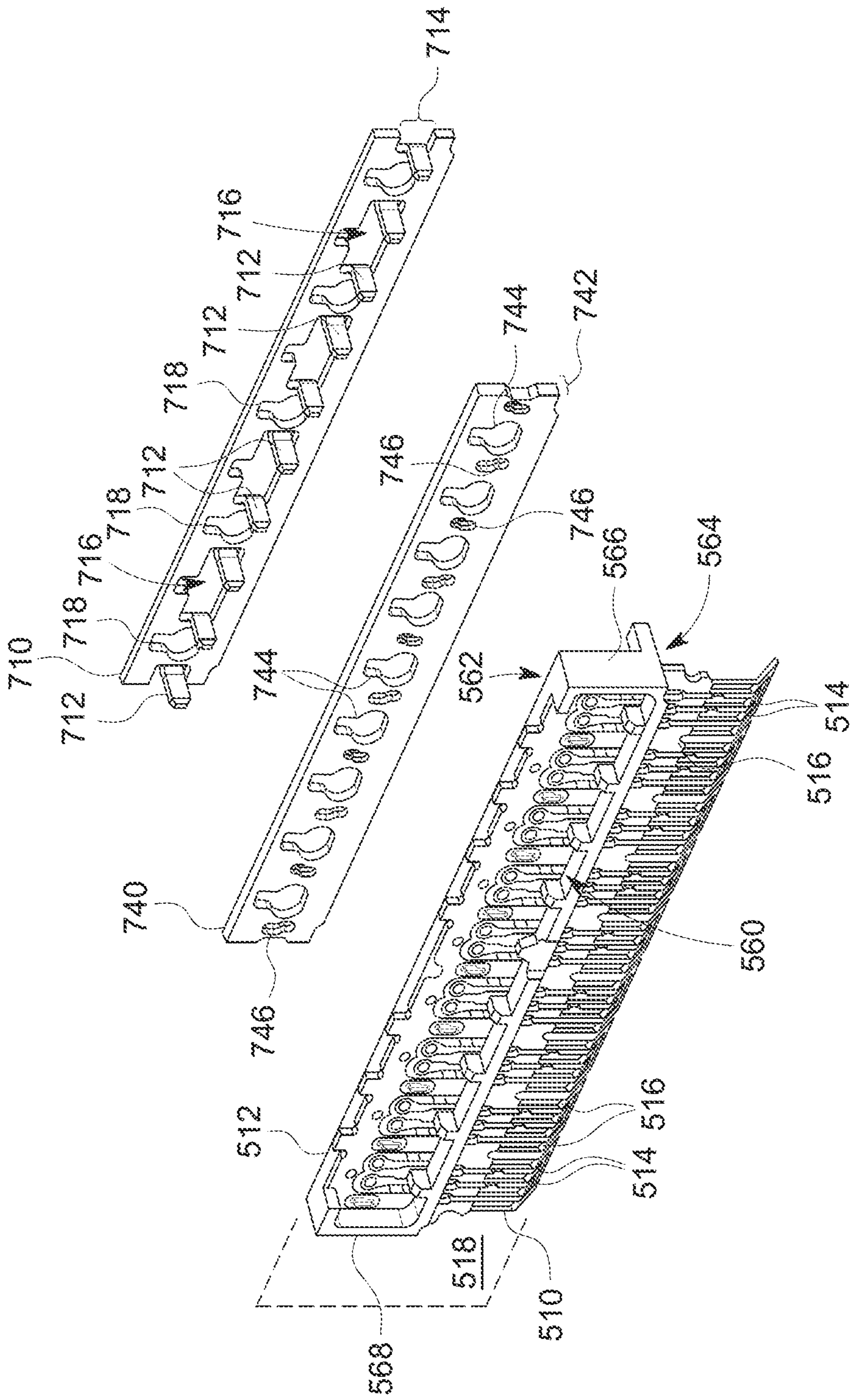
FIG. 36 is a perspective assembly view from the front of the second terminal wafer including a conductive ground shielding adjacent thereto.
Figure 37:
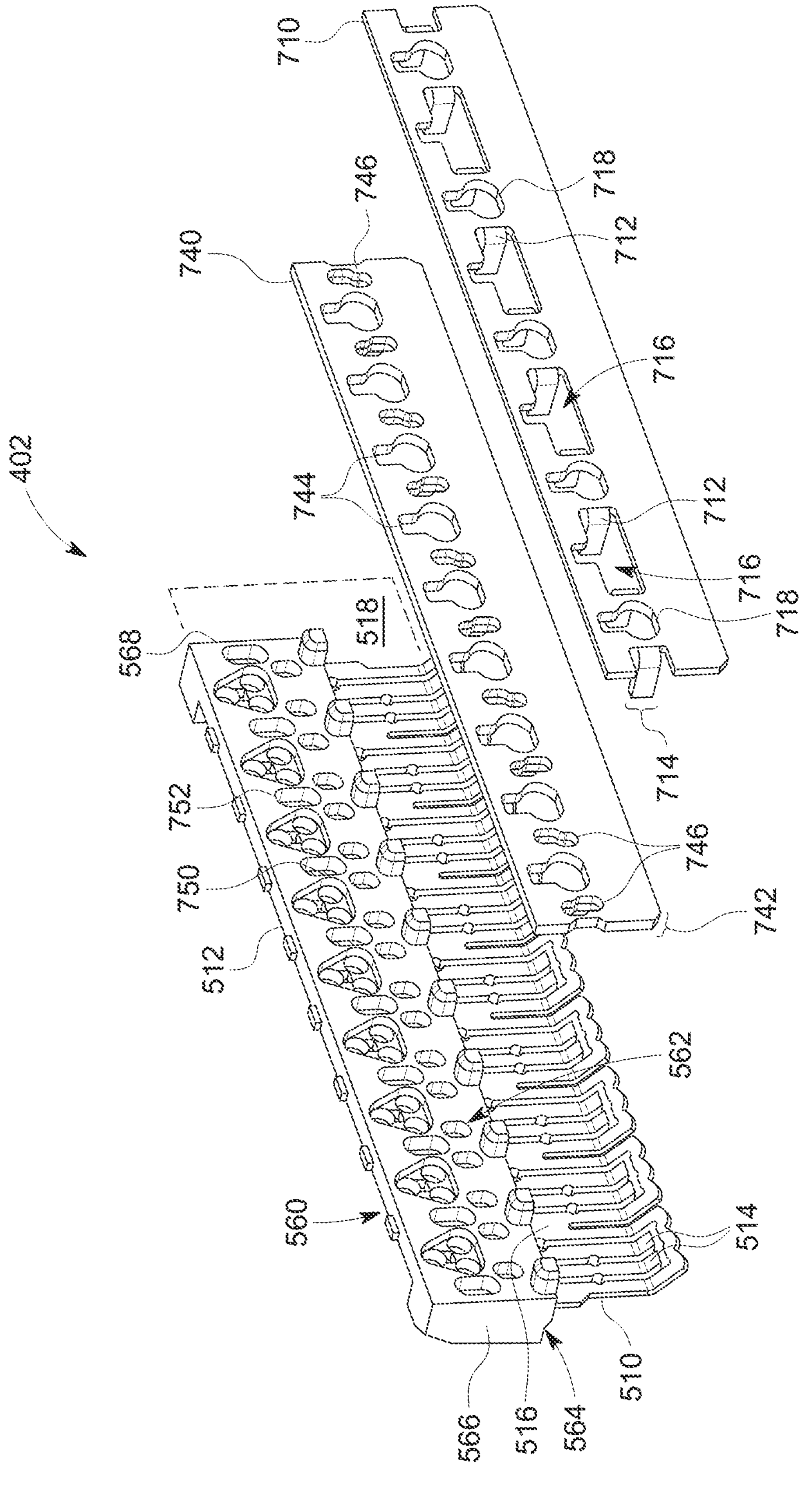
FIG. 37 is a perspective assembly view from the rear of the second terminal wafer including the conductive ground shielding adjacent thereto.

In the embodiment illustrated in FIG. 38, the grounding apertures 750 are non-complementary in shape or alignment with the ground projections 712 to twist or distort the ground projection upon insertion. For example, the grounding apertures 750 can include first and second offset legs 754 that are laterally offset with respect to the vertical alignment of the grounding projections 612. As illustrated in FIGS. 36-37, to attach the second ground shielding 602 to the second terminal wafer 404, the protrusion plate 710 is placed adjacent to the terminal support molding 512 with the grounding projections 712 aligned with the plurality of grounding apertures 750 in the ground terminals 516. The intermediate plate 740 can be positioned between the terminal support molding 512 and the projection plate 710 so that the grounding projections are received and an extend through the slots 746 in the intermediate plate. Upon insertion of the grounding projections 712 into the grounding apertures 750, the offset legs 754 cause the tab-like grounding projections to rotate or twist with respect to the vertical extension of the grounding projection and the ground terminal 516. The torsional force caused by distortion of the grounding projections 712 results in good mechanical and electrical connection between the second ground shielding 602 and each of the ground terminals 516. As can be appreciated, because the tab-like grounding projections 712 extend at either side of the cable openings 718 of the protrusion plate 710 and cable openings 744 of the intermediate plate 740, the grounding projections can shield and isolate signal conductors in the second cable plurality within the second terminal wafer 602.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context. Still further, the advantages described herein may not be applicable to all embodiments encompassed by the claims.

The invention claimed is:

1. A connector assembly, comprising:

a plug connector comprising a plug housing and a plug terminal subassembly, the plug terminal subassembly comprising:

a conductive plug terminal array comprising a plurality of plug signal terminals and a plurality of plug ground terminals;

a terminal support molding disposed about and supporting the plurality of plug signal terminals and the plurality of plug ground terminals; and a ground bar comprising a plurality of blades projecting from a common spine, a blade among the plurality of blades being configured to mechanically and electrically interconnect with a plug ground terminal among the plurality of plug ground terminals; and a receptacle connector comprising a receptacle housing and a receptacle terminal wafer, the receptacle terminal wafer comprising:

a conductive receptacle terminal array comprising a plurality of receptacle signal terminals and a plurality of receptacle ground terminals;

a first receptacle wafer and a second receptacle wafer;

a first cable alignment member comprising a plurality of first cable bores to align cables for the first receptacle wafer; and a second cable alignment member comprising a plurality of second cable bores to align cables for the second receptacle wafer.

2. The connector assembly of claim 1, wherein the first cable alignment member and the second cable alignment member comprise a cooperating projection and a recess to join and align the first cable alignment member with the second cable alignment member.

3. The connector assembly of claim 1, further comprising:

a ground shield projection plate positioned between the first receptacle wafer and the second receptacle wafer in the receptacle connector, wherein:

the conductive receptacle terminal array extends at least in part in a common array plane; and the ground shield projection plate comprises a plurality of grounding projections that extend perpendicularly to the common array plane.

4. The connector assembly of claim 3, wherein:

the plurality of receptacle ground terminals in the conductive receptacle terminal array comprise a plurality of grounding apertures; and the plurality of grounding projections of the ground shield projection plate are non-complementary in shape with the plurality of grounding apertures and twist the plurality of receptacle ground terminals when the plurality of grounding projections are inserted into the plurality of grounding apertures.

5. The connector assembly of claim 1, wherein:

the plug housing comprises a mating face, a mounting face spaced apart from the mating face, and a wall extending between the mating face and the mounting face;

the conductive plug terminal array comprises a terminal mating end extending above the terminal support molding and a terminal mounting end extending below the terminal support molding; and the terminal subassembly is configured to move with respect to the plug housing between a first position where the terminal mounting end is spaced apart from the mounting face and a second operational position where the terminal mounting end is coplanar with the mounting face.

6. A receptacle connector, comprising:

a housing and a terminal wafer, the terminal wafer comprising:

a conductive terminal array comprising a plurality of signal terminals and a plurality of ground terminals;

a first wafer and a second wafer;

a first cable alignment member comprising a first alignment projection received in a first recess of the housing and a first cable bore to align a first cable for the first wafer; and a second cable alignment member comprising a second alignment projection received in a second recess of the housing and a second cable bore to a align second cable for the second wafer.

7. The receptacle connector of claim 6, wherein the first cable alignment member and the second cable alignment member comprise a cooperating projection and a recess to join and align the first cable alignment member with the second cable alignment member.

8. The receptacle connector of claim 6, further comprising a ground shield positioned between the first wafer and the second wafer in the receptacle connector.

9. The receptacle connector of claim 8, wherein ground shield comprises a plurality of cable openings.

10. The receptacle connector of claim 8, wherein:

the conductive terminal array extends at least in part in a common array plane; and the ground shield comprises a plurality of grounding projections that extend perpendicular to the common array plane.

11. The receptacle connector of claim 8, wherein:

the ground shield comprises a projection plate and an intermediate plate;

the projection plate comprises a plurality of grounding projections; and the intermediate plate comprises a plurality of slots aligned with the plurality of grounding projections of the projection plate.

12. The receptacle connector of claim 8, wherein:

the conductive terminal array comprises a grounding aperture;

the ground shield comprises a grounding projection; and the grounding projection of the ground shield is non-complementary in shape with the grounding aperture of the conductive terminal array and twists a ground terminal among the plurality of ground terminals when the grounding projection is inserted into the grounding aperture.

13. The receptacle connector of claim 12, wherein the grounding aperture comprises an offset leg that is laterally offset from the grounding projection.

14. The receptacle connector of claim 8, wherein:

the plurality of ground terminals in the conductive terminal array each comprises a grounding aperture;

the ground shield comprises a plurality of grounding projections; and the plurality of grounding projections are non-complementary in shape with the plurality of grounding apertures and twist the plurality of ground terminals when the plurality of grounding projections are inserted into the plurality of grounding apertures.

15. A plug connector, comprising:

a housing comprising a mating face, a mounting face spaced apart from the mating face, a wall extending between the mating face and the mounting face, and an opening disposed in the mounting face; and a terminal subassembly comprising a terminal wafer, the terminal wafer comprising a plurality of terminals and a terminal support molding disposed about and supporting the plurality of terminals, the plurality of terminals comprising a terminal mating end extending above the terminal support molding and a terminal mounting end extending below the terminal support molding, wherein the terminal subassembly is configured to move with respect to the housing between a first position where the terminal mounting end is spaced apart from the mounting face and a second position where the terminal mounting end is coplanar with the mounting face.

16. The plug connector of claim 15, wherein a plane of the terminal mounting end is below a mounting plane of the mounting face in the first position.

17. The plug connector of claim 15, wherein the housing comprises a latch arm configured to support the terminal subassembly in the first position with respect to the housing.

18. The plug connector of claim 17, wherein:

the terminal support molding comprises an upper latch recess and a lower latch recess;

the latch arm engages the upper latch recess in the first position; and the latch arm engaging the lower latch recess in the second position.

19. The plug connector of claim 15, further comprising a ground bar comprising a plurality of blades projecting from a common spine, each of the plurality of blades configured to mechanically and electrically interconnect with a respective ground terminal among a plurality of ground terminals of the plurality of terminals.

20. The plug connector of claim 19, wherein each of the plurality of ground terminals comprises an aperture and each of the plurality of blades is inserted into the aperture of a respective one of the plurality of ground terminals.

* * * * *